(12) United States Patent
Seymour

(10) Patent No.: US 7,032,508 B2
(45) Date of Patent: Apr. 25, 2006

(54) PRINTING PRESS

(75) Inventor: John C. Seymour, Jefferson, WI (US)

(73) Assignee: Quad/Tech, Inc., Sussex, WI (US)

(*) Notice: Subject to any disclaimer, the term of this patent is extended or adjusted under 35 U.S.C. 154(b) by 42 days.

(21) Appl. No.: 10/394,903

(22) Filed: Mar. 21, 2003

(65) Prior Publication Data

US 2004/0182262 A1 Sep. 23, 2004

(51) Int. Cl.
*B41F 5/00* (2006.01)

(52) U.S. Cl. .................... 101/211; 101/483; 101/484; 358/1.9

(58) Field of Classification Search ............... 101/211, 101/483, 484; 358/1.9
See application file for complete search history.

(56) References Cited

U.S. PATENT DOCUMENTS

| | | | |
|---|---|---|---|
| 4,003,311 A | 1/1977 | Bardin | |
| 4,500,919 A | 2/1985 | Schreiber | |
| 4,975,862 A | 12/1990 | Keller et al. | |
| 5,014,618 A | 5/1991 | Zingher et al. | |
| 5,029,527 A | 7/1991 | Jeschke et al. | |
| 5,068,810 A | 11/1991 | Ott | |
| 5,170,711 A | 12/1992 | Maier et al. | |
| 5,224,421 A | 7/1993 | Doherty | |
| 5,343,234 A | 8/1994 | Kuehnle | |
| 5,412,577 A * | 5/1995 | Sainio et al. ............... 700/124 |
| 5,689,425 A * | 11/1997 | Sainio et al. ............... 700/124 |
| 5,724,259 A * | 3/1998 | Seymour et al. ............ 382/199 |
| 5,767,980 A * | 6/1998 | Wang et al. ................. 358/475 |
| 5,774,225 A | 6/1998 | Goldstein et al. | |
| 5,809,984 A * | 9/1998 | Johnson ....................... 124/86 |
| 5,835,626 A | 11/1998 | Huber et al. | |
| 5,841,955 A | 11/1998 | Wang | |
| 5,870,529 A | 2/1999 | Kistler et al. | |
| 5,897,239 A | 4/1999 | Caruthers, Jr. et al. | |
| 5,927,201 A | 7/1999 | Birkenfeld et al. | |
| 5,953,990 A | 9/1999 | Chalmers et al. | |
| 5,992,318 A * | 11/1999 | DiBello et al. ............. 101/181 |
| 6,024,018 A * | 2/2000 | Darel et al. ................. 101/365 |
| 6,041,708 A | 3/2000 | Kipphan et al. | |
| 6,050,192 A * | 4/2000 | Kipphan et al. ............ 101/232 |
| 6,230,622 B1* | 5/2001 | Dilling ....................... 101/484 |
| 6,324,975 B1* | 12/2001 | Kondo ........................ 101/171 |
| 2001/0003955 A1* | 6/2001 | Mayer et al. ............... 101/183 |
| 2002/0059879 A1* | 5/2002 | Komori et al. ............. 101/484 |
| 2003/0058462 A1* | 3/2003 | Martinez et al. ........... 358/1.9 |
| 2004/0042022 A1* | 3/2004 | Friedman et al. ........... 358/1.9 |
| 2004/0051061 A1* | 3/2004 | Warner .................. 250/559.44 |
| 2004/0118180 A1* | 6/2004 | Keating ...................... 73/1.81 |
| 2004/0141192 A1* | 7/2004 | Jodra et al. ................. 358/1.9 |

OTHER PUBLICATIONS

Pocket Pal—A Graphics Art Production Handbook, pp. 26-27, International Paper, Fifteenth Edition, 1992.*

* cited by examiner

*Primary Examiner*—Minh Chau
(74) *Attorney, Agent, or Firm*—Michael Best & Friedrich, LLP

(57) ABSTRACT

An apparatus and method is described wherein a printing press is profiled during production press runs and wherein ink color is controlled.

36 Claims, 11 Drawing Sheets

PRINTING PRESS

FIELD OF THE INVENTION

The invention relates generally to printing, and more particularly, the invention relates to the creation of a profile from a press and the management of ink on a printing press.

BACKGROUND OF THE INVENTION

A recent development in printing technology is the process of profiling hardcopy printing devices. In the profiling of hardcopy printing devices, a broad selection of color patches is printed that samples the entire printing gamut. The colors of these patches are measured. The measured color is then used to either modify the colors of a proof such that the proof matches more closely with the printed product, or to modify the colors produced on press of the printed product such that the product matches more closely with the target colors.

Currently in order to profile a gravure printing press, a special and costly test run is required to produce the test target.

A factor that can effect a printing press profile is the coating on the paper stock which can have a large influence on ink color printed. Other factors such as paper color and ink formulation also have an effect on the color printed on the paper. Further, the profile of a given press gradually changes over time, and may require constant and frequent updating. Updating a profile is a costly and time consuming process.

In a typical gravure printing press, concentrated ink and solvent are mixed in a sump. The concentrated ink includes pigments, varnish, wax, surfactant and the like. The solvent is used to thin the concentrated ink to a proper consistency. Factors that effect color on a gravure press include the variety of sizes of the gravure cells, the pigment concentration of the ink, and the viscosity of the ink/solvent mixture. Among the effect associated with the viscosity of the ink/mixture is that less viscous mixture leaves the gravure cells and transfers to the paper much more readily than mixture that is more viscous. Specifically, variations in viscocity will have an effect on the highlight cells. An increase in viscosity will reduce the amount of ink released from a highlight cell far more than the same increase in visocity will effect the ink released from a shadow.

Further, solvent is generally volatile, and therefore, has to be replenished frequently. As a result, gravure presses are equipped with a control mechanism to maintain a constant viscosity of the ink and solvent mixture through the addition of solvent.

When a float valve coupled to the sump senses that the volume of ink has dropped below a predetermined level, the printing press will perform a dump process. In the dump process, a controlled amount of ink is added to the sump through the float valve.

Viscosity control mechanisms generally employ some variation of a Zahn cup or the like as a viscometer. The viscosity of the ink is determined by measuring the time required for a measured amount of the ink to pass through a small precision orifice. For example, the pressure of the ink activates mechanical switches used for timing the egress of the ink. Alternatively, an emitter-detector pair and associated electronics perform the same function. Other applications use a hydrometer to measure a specific gravity of the ink that is directly related to the viscosity of the ink.

In addition to viscosity, ink temperature can also have an effect on gravure press color. As ink temperature rises, ink generally becomes less viscous. As the ink and solvent mixture becomes less viscous, the highlights and shadows of the print work will be affected. Since high pressure at the nip and the high speed of a gravure print cylinder create heat, a temperature control mechanism is typically used to control the temperature of the ink in the range of about 70° F. to about 80° F. The control mechanism generally consists of a controlled flow of chilled water through pipes that weave back and forth through the sump.

More specifically, several different print parameters are controlled in a gravure press. One of these parameters is the optical density of the shadows of the print work. Another such print parameter is the optical density of the highlights. The ink concentration and the viscosity of the mixture will generally affect these parameters. Particularly, the concentration affects the shadow of the print work. On the other hand, the viscocity affects mainly the color of the highlights. However, prior ink control systems incorporate ink density control but do not deal adequately with viscosity control. This does not allow for adjusting ink to the proper formulation in order to achieve proper highlights and shadows.

In some gravure printing presses, there exists the ability to combine three fluids in the ink fountain: a concentrated ink, a solvent, and an extender. The extender is essentially a concentrated ink without the pigment. By mixing the concentrated ink and the extender on press, it is possible to meet the particular needs of a variety of customers without specially pre-mixed formulations.

The addition of the three fluids on such a gravure press is typically controlled at two levels. In the sump, a viscometer controls the addition of solvent to make up for the rapid evaporation of the solvent. A level indicator controls the addition of ink. If the ink level drops below a certain point, fixed volumes of concentrated ink, extender and solvent are added, respectively. In general, a press operator sets the relative volumes of these fluids at the beginning of a printing run. However, while the blending of the mixture is automatic, a pressman is required to monitor the print work, to modify and to set the mixture when necessary.

SUMMARY OF THE INVENTION

The present invention includes a method for the collection of a profile of a printing press during a production press run. The method includes printing a colorbar onto a web during a production press run and measuring the color of a plurality of the color patches within the colorbar to provide a profile of the press. In designing the colorbar, several factors are considered. Exemplary design factors include the need to sample the entire ink color gamut, the need for landmark patches for each ribbon of the web for quality control and diagnostic purposes, the desire for contiguous patches to be dissimilar in reflectance, and the handling of webs with narrow widths. The press profile also includes press data such as time, date, paper type, ink formulation, ink temperatures, ink viscosity, customer, press identifier, and the like. By acquiring press profiles during production runs of the press, profiles can be obtained inexpensively and under numerous printing conditions.

The present invention provides a method for profiling a printing press. The method includes adjusting ink color on a first production press run, measuring the ink color printed on the web, storing the measured ink colors in a first profile, and repeating the process to create profiles for preferably all subsequent production press runs. Each profile preferably includes information on the printing conditions during each press run and preferably the ink color is measured from a colorbar printed on the web using a video-based measuring system.

The present invention provides a method for the collection of a profile of a printing press. The method includes printing a colorbar onto a web during a production press run, and measuring the color of a plurality of color patches within the colorbar to provide a profile of the printing press. Furthermore, the method also includes storing the profile in conjunction with data pertaining to the printing conditions during the press run.

The present invention provides a press printing method. The method includes acquiring the profiles of a single press under varying printing conditions, and storing the profiles for subsequent retrieval. The method also includes selecting one of the stored profiles, and using the information in the selected stored profile in a current press run to produce a printed product having an actual ink color that closely matches a desired ink color.

The present invention provides a second press printing method. The method includes acquiring the profiles of a single press under varying printing conditions, storing the profiles for subsequent retrieval, selecting one of the stored profiles, and using the information in the selected stored profile to produce a proof of a printed product.

The present invention provides a method of printing. The method includes printing a colorbar onto a web during a production press run, and measuring the color of a plurality of the color patches within the colorbar to provide a profile of the printing press. The method also includes using the information in the profile for quality control purposes and/or diagnostic purposes such as to identify engraving miscalibration and to identify problems with the functioning of the doctor blade.

The present invention provides a method of controlling ink color in a gravure printing press. The method includes printing a colorbar onto a web using a gravure press, and measuring the ink color of a plurality of the color patches in the colorbar. The method also includes using the measured ink color to make adjustments to the proportions of concentrated ink and solvent in an ink fountain of the gravure press. In one embodiment, the proportions of any extender are also adjusted and all adjustments are made without operator intervention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION OF THE PREFERRED EMBODIMENTS

Figure 1:
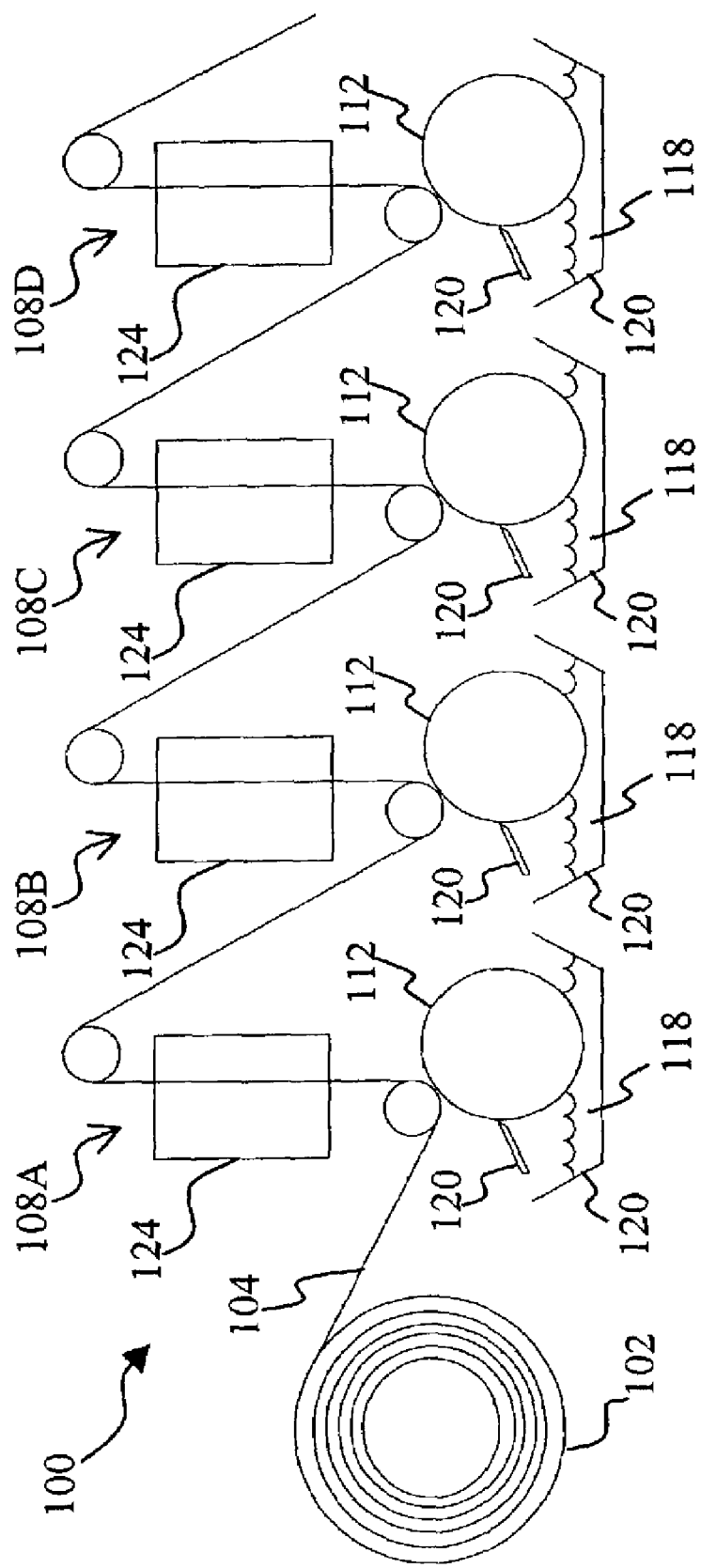
FIG. 1 is a schematic of a gravure press.

FIG. 1 illustrates a four-color, single-sided gravure press 100. The gravure press 100 includes a paper roll 102 feeding a web 104 into a first print unit 108A. The first print unit 108A includes a gravure cylinder 112 rotating in an ink fountain 116 where ink 118 fills engraved cells in the cylinder 112. A doctor blade 120 scrapes the cylinder surface such that only ink residing in the engraved cells is available to the web 104 in the printing process. The web 104 proceeds from the gravure cylinder 112 to a dryer unit 124, where the ink 118 on the web 104 is dried. More specifically, each of the cells on the cylinder 112 comes directly into contact with the ink 118 in the first gravure print unit 108A. Thereafter, the cells will be filled with the ink/solvent mixture 118 to be transferred to the web 104. Before the ink/solvent mixture 118 is transferred to the web 104, a doctor blade 120 removes any excess mixture so that the cells store precisely the required amount of mixture 118 when the cylinder 112 is in contact with the web 112. This process is repeated for each of the three other illustrated print units 108B, 108C and 108D. In a typical operation cyan, magenta, yellow, and black inks are sequentially applied.

Figure 2:
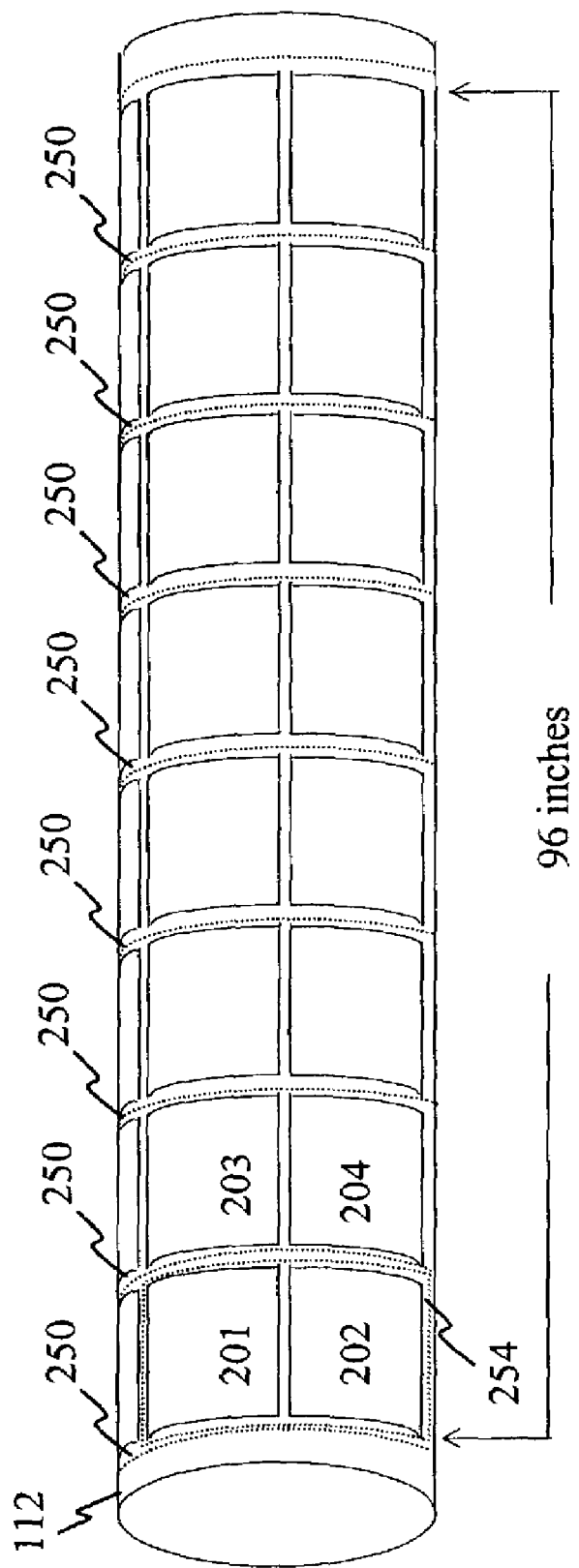
FIG. 2 is a perspective view of a gravure printing cylinder illustrating a typical layout of pages.

Gravure printing presses have a variety of applications, such as advertising materials (flyers, catalogs), packaging and magazines. An exemplary layout of printing templates for the production of a magazine on a gravure cylinder 112 is shown in FIG. 2. The web 104, passing around the gravure cylinder 112, is generally cut into a plurality of contiguous page ribbons 250. As detailed hereinafter, each ribbon 250 can be folded into at least one signature. For example, a signature may include eight pages from two ribbons. Pages are generally laid out such that a foot of the page parallels an edge of the web 104. Typical cylinder width ranges from, but is not limited to, about 55 inches to about 108 inches. For example, a 96-inch cylinder allows for eight ribbons across the web 104.

A conventional folder is used to cut and fold the web 104 after it is printed. When the web 104 enters a folder, the web 104 is cut circumferentially with a slitter between pages thereby forming a plurality of cut page ribbons 250. For example, pages 201, 202 and others around the cylinder 112 will be on a first ribbon, and pages 203, 204 and then around the cylinder 112 will be on a second ribbon. Each ribbon 250 is then cut generally between every other page laterally into a plurality of signatures 254. The cutoff in the previous example will be performed before page 201 and after page 202. This allows pages 201 and 202 to remain connected, and have a fold there between.

Figure 3:
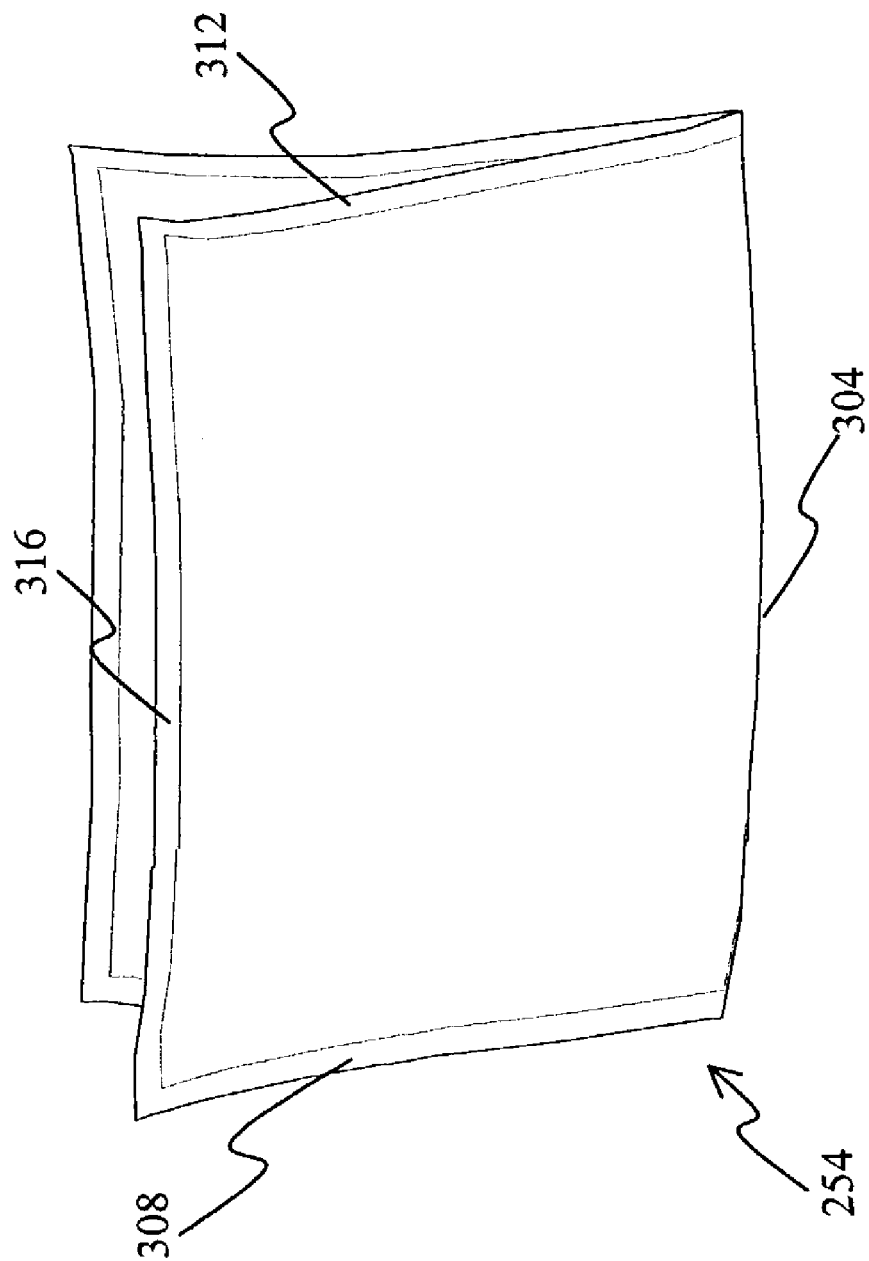
FIG. 3 is a perspective view of a signature.

FIG. 3 illustrates a signature 254 with a fold 304. Each folded signature 254 often includes a narrow region of paper which is trimmed once a print product made up of the signatures 254 has been bound. An exemplary region is 1/8 inch wide around the edge of the signature 254 as indicated in dotted lines in FIG. 3. There are generally three types of regions including a head region 308, a foot region 312, and an edge region 316.

According to the present invention, a colorbar and preferably a full gamut colorbar can be printed in the edge region 316 and later trimmed. In the event that the print product is to be perfect bound, the colorbar may also be printed at the fold 304. For a 55-inch web, a 1/8 inch wide by 55-inch long region is available for a placement of a colorbar. If the colorbar is made up of patches which are 1/8 inch circumferentially and 1/10 inch laterally, there will be space for 550 patches on the 55-inch web.

Figure 4:
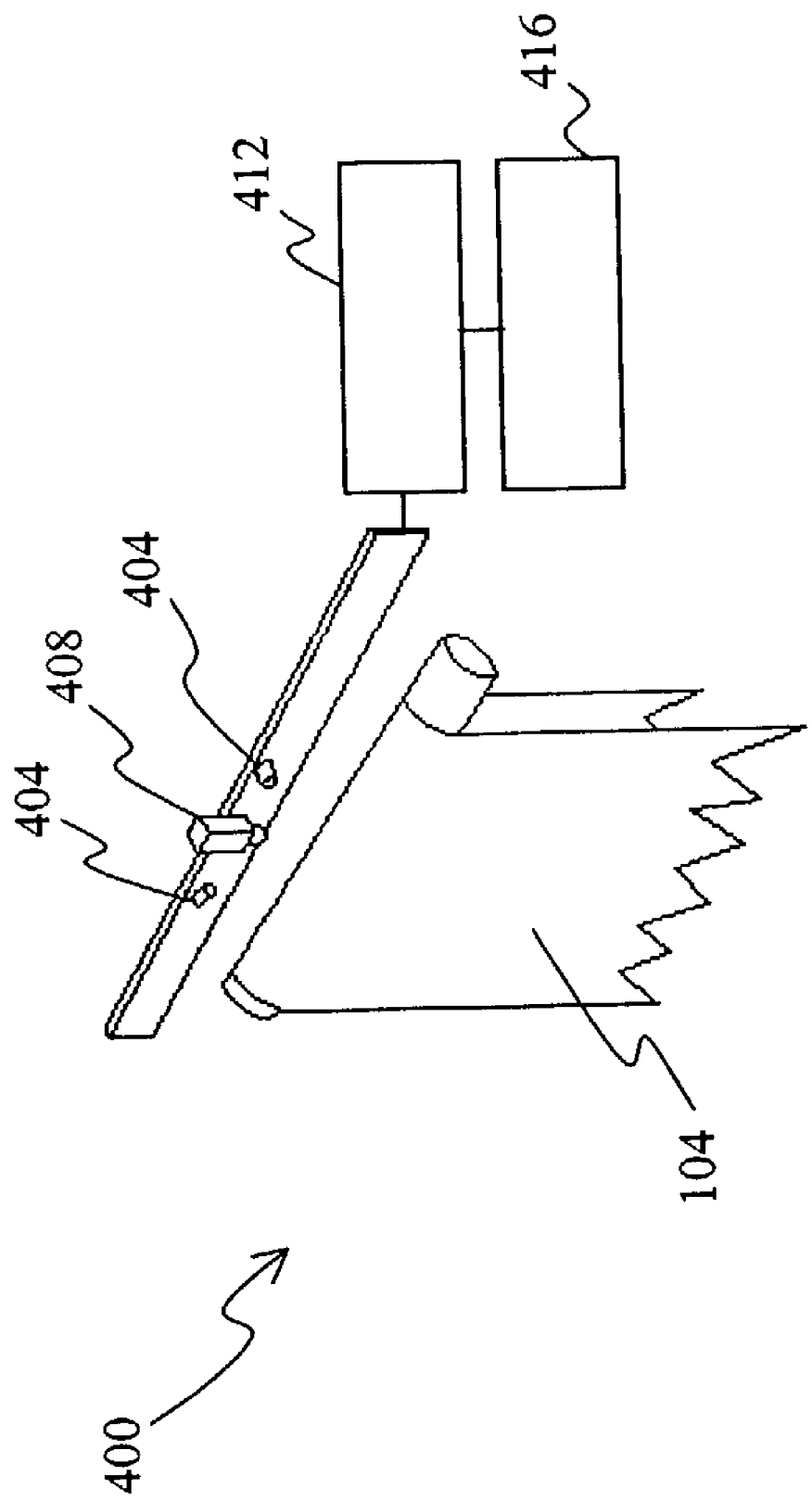
FIG. 4 is a perspective view of a color measurement system.

In one embodiment, the plurality of color patches making up the full gamut colorbar will be measured directly on press during a production run of the gravure press using a video-based monitoring system 400 as shown in FIG. 4. The monitoring system 400 generally includes a plurality of strobe lights 404 and a camera 408 mounted away from the print units 108A, 108B, 108C, and 108D (of FIG. 1). The monitoring system 400 includes a conventional processor 412 and a conventional user-interface 416. While a gravure press is used to describe the embodiment, the present invention is also applicable in other printing presses such as web offset printing presses.

Once the camera 408 has acquired an image of the colorbar, the RGB values of the image are converted to their colorimetric equivalents using a transformation equation as follows:

$$\begin{bmatrix} X \\ Y \\ Z \end{bmatrix} = \begin{bmatrix} 0.868 & 0.046 & 0.115 & 0.042 & 0.074 & 0.084 & -0.136 & 0.018 & -0.037 \\ 0.425 & 0.527 & -0.012 & -0.059 & -0.031 & 0.031 & 0.174 & -0.014 & -0.038 \\ -0.017 & 0.064 & 0.976 & 0.031 & -0.003 & 0.000 & -0.039 & -0.054 & 0.039 \end{bmatrix} \begin{bmatrix} R \\ G \\ B \\ R^2 \\ G^2 \\ B^2 \\ RG \\ RB \\ GB \end{bmatrix} \quad (E1)$$

However, it should be noted that other methods for transforming the RGB values to their colorimetric equivalents can also be used. The coefficients of the transformation matrix depend upon the specifics of the spectral response of the camera 408 and the strobe light 404 used, as well as the reflectance spectra of the ink 118 on the print work.

To incorporate the full gamut colorbar of different patches, several design considerations are taken into account. For example, the need for sampling the entire printing gamut, and for landmark patches for each ribbon or ink key zone have to be considered. Another design factor is the arrangement of the different patches such that contiguous patches are viewed as dissimilar by a camera. Furthermore, the width of a web should be considered carefully. Although only four design factors are described, other factors such as the type of print work and the like, can also be considered.

With respect to the first consideration, it is desirable for the color patches of the colorbar to include all the available printed colors thus defining a full gamut colorbar. For example, the colorbar may include patches at each of five tone values (0%, 25%, 50%, 75%, and 100%) for each of the four inks (cyan, magenta, yellow and black) for a total of 5×5×5×5=625 patches. However, the color change between shades of any non-black added to a 100% black is very small, while the color change when mixing nearly equal amounts of cyan, magenta and yellow is fairly large. In one embodiment, CYM space is sampled at seven tone values for each of the three inks for a total of 7×7×7=343 patches. In addition, CMYK space is sampled at three tone values for each of the four inks while not sampling black (or, K=0), which requires a total of (3−1)×3×3×3=54 patches. If more accuracy is required for a fixed number of patches, other CMYK space sampling schemes may be used.

Turning now to the second design consideration for the colorbar, when a gravure cylinder 112 is engraved, each ribbon 250 is typically engraved with a different engraving head. While separate engraving shortens the time to engrave the entire cylinder 112, it may introduce engraving head calibration differences. The calibration differences can interfere with the uniformity of ink resting in and releasing from the cells of the cylinder 112. Using a colorbar that covers the width of the web 104 is dependent upon the gravure press producing the color. Since the entire gravure cylinder 114 rests in a single ink fountain 116, uniformity of ink across the web 104 is generally provided. For example, a 5% tone value in one ribbon 250 should produce a similar 5% tone value in another ribbon along the same cylinder 250. However, calibration of the individual engraving heads can disrupt the ink uniformity. For example, unevenly engraved cells will draw more or less ink than others, thereby creating a nonuniform spread of ink between ribbons. It is therefore desirable to verify the accuracy of the engraving head calibration of each cylinder 112.

The landmark patches serve as a quality control for the imaging of the gravure cylinder 112. Miscalibration of the engraving heads is detected by organizing the colorbar such that each ribbon 250 has a set of landmark patches that can be compared across the web 104. For example, each ribbon 250 may have a 100%, a 75%, a 50% and a 25% patch of each of the four inks. With eight page ribbons 250 on a typical 96-inch web 104, a total of 128 landmark patches will be required. If the measured ink color values for any of the landmark patches fall outside certain predetermined limits, a profile will not be generated for that production print job. The landmark patches provide an early indication of a calibration problem in an engraving head. Furthermore, the landmark patches serve as a diagnostic tool for the press 100. For example, if the doctor blade 120 is worn or cocked, the measured ink colors of the landmark patches will show an ink trend across the web 104. The miscalibration of the engraving heads or other engraving head issues can then be stored as a part of the profile over time. The tracking therefore provides how the engraving head performs in a run over time.

In the case of a web offset printing press, it is necessary to engineer a very thin layer of ink to present to a printing plate, and there is no mechanism at the plate to limit and control the thickness of the ink that the plate will take up. A series of rollers or ink train is thus installed to spread the ink to a uniform and controlled thickness. However, the ink train generally separates the ink source from the printing plate. As a result, the precise quantity of ink required at the printing plate is regulated at the intake of the ink train with a set of ink keys. The ink keys are individually calibrated and are usually deployed laterally across the width of the first roller in the ink train. Therefore, the overall ink uniformity across the width of the web is not generally assured.

Consequently, color control devices are used to provide some uniformity with the ink keys. The color control devices are generally configured such that a press operator will have to establish a plurality of ink key zones where different degrees of color saturation can be adjusted, which further contributes to the inconsistent ink levels across the web. Therefore, it is difficult to compare the measurements from different parts of the web because of all the different error contributing factors. For example, the differences between two halftone dots of the same color may be due to the printing plate on the first dot, and the lateral position of the second dot.

As a result, the use of one set of landmark patches per ink key in a web offset press may be necessary. Specifically, depending on the application requirements, the landmark patches may consist of, for example, a solid patch and a 50% tone value patch for each of the inks. Alternatively, the landmark patches may consist of a plurality of 60% tone value patches of all available inks. Details of such are described hereinafter.

Turning now to the third design consideration for the colorbar, another factor is the rate at which the patches are recognized. It is desirable to have dissimilar adjacent patches in terms of respective reflectance values detected by the camera 408, and more particularly as seen through a single channel of the camera 408. As a result, a patch arrangement algorithm is used to ensure that reflectance of adjacent patches are dissimilar. First, a test target containing all the patches is printed. The reflectance of these patches in one channel, for example the green channel, of camera 408 is measured and recorded. However, measuring and recording the reflectance of patches can be time consuming and costly. Alternatively, the patch reflectances can also be estimated based on prior profiles. Once the reflectance values are obtained, the list of reflectance values and the corresponding patch numbers is sorted from the highest reflectance value to the lowest.

Once an order of patches is established, the ordered patch list is subdivided into three lists including a high list of patches with the highest reflectance, a low list of patches with the lowest reflectance, and an in-between list of patches with the rest of the reflectance values. A first patch is selected from the top of the high list. A second patch is then selected from the top of the in-between list. A third patch is then selected from the top of the low list. A fourth patch is then selected from the second highest reflectance in the high list. The arrangement process continues by selecting the next high reflectance from the lists in a round-robin fashion.

An example of the algorithm is demonstrated as follows. In a simplified printing scenario, it is assumed that a total of six patches are required. The reflectance values are 1) 0.314, 2) 0.728, 3) 0.462, 4) 0.197, 5) 0.026, and 6) 0.392, respectively. Once the list is sorted by reflectance, the new ordered list is 2) 0.728, 3) 0.462, 6) 0.392, 1) 0.314, 4) 0.197, and 5) 0.026. The high list thus contains patches 2) and 3), the in-between list includes 6) and 1), and the low list contains 4) and 5). The re-shuffling then yields the following order: 2) 0.728, 6) 0.392, 4) 0.197, 3) 0.462, 1) 0.314, and 5) 0.026. In this way, adjacent patches differ in percentile of reflectance by either 33% or 67% and therefore differ sharply in reflectance.

These ordered patches are thereafter inserted into areas where no patch is printed, and preferably clumped together such that the system 400 can concentrate on these patches during the makeready process.

Other algorithms may be used to order the color patches to ensure dissimilarities between adjacent patches. In particular, when more color channels are used, other sorting algorithms or additional steps to the exemplary algorithm can be employed. Furthermore, a monitoring system 400 capable of distinguishing fine intensity levels may not require any patch ordering.

Turning now to the fourth design consideration for the colorbar, it may be desirable to utilize a full gamut colorbar accommodating a different number of patches for smaller web widths. If so, a colorbar can be developed for the narrowest web and utilized for all other web widths. While a smaller colorbar means less data points are available, the data points will be consistent from one printing job to another. The entire set of landmark patches is still preferably printed on each of the ribbons 250.

Under some conditions, the regions of signature 254 as shown in FIG. 3 may be too small to accommodate a colorbar or a reasonable subset of the patches, or the printed material may have no trim region. On the other hand, print material such as magazine, catalog, or bound print work, has a fair amount of trim that can be used for color patches.

Commercial printing conditions that require special attention include insert work such as coupon printing, and print work that requires a narrow web. In the case of insert work, which is not typically bound, the print work is generally not trimmed. In the case of the narrow web print work, while there is room for a colorbar, the amount of room is typically limited. As a result, only a small number of patches can be accommodated in the trim region. Non-commercial printing that may have little or no room for a full gamut color include textile printing, and wallpaper printing.

In the case of an offset printing press where typical web offset printing web ranges from 38" to 57", a plurality of ink keys will control the amount of ink releasing onto the web. Offset printing presses often require the press operator to adjust each ink key individually, which may further lead to uneven ink distribution across the web. In general, the ink keys are 40 mm wide, and there are 40 ink keys positioned laterally across the web. Each ink key can accommodate about 15 patches. Therefore, a total of 600 patches are available. However, each ink key contains a set of landmark patches to ensure uniformity across the web. For example, if only a 100% tone value or solid patch and a 50% tone value or halftone patch are used for each color, each ink key will have a total of eight patches used for the landmark patches. As a result, there is only space for seven patches left. That is, a total of 280 patches are left for the full gamut colorbar across the web. Depending on applications, less landmark patches may also be used to accommodate more color patches. In one embodiment, a 70% tone value patch is used for each color employed. In this way, 440 color patches can be printed across the web. If there is insufficient room for all the patches required, a representative set of patches will be used, and the intermediate CMYK values can be estimated by interpolating between actual values of the selected patches.

In the absence of a colorbar, the equivalent of the colorbar can be determined from the print work using prepress information. In other words, a press profile is established from the actual print work rather than from a specially designed colorbar. Specifically, the collection of a press profile from the print work includes at least two processes. The first process is generally done during, but not limited to, a pre-press process. The second is generally done at, but not limited to, a press process. These processes are detailed hereinafter.

Among other things, the prepress process selects sample areas from the print work where accurate measurements can be made. The prepress process also determines whether the print image in a given run is sufficiently colorful for a profile to be taken from the print work. For example, a sufficiently colorful print image will consist of a wide enough sampling from a CMYK space or a wide enough combination of inks printed on the print work. Furthermore, the prepress process also generates a digital likeness of the print image that can be used as a roadmap to locate the same sample areas in an acquired image of the print work. However, when the print work does not have a wide enough combination of inks, the profile generation will be terminated for the run.

To obtain an accurate measurement from a print work, the sample area has to be sufficiently large. Specifically, the measurement area has to be large enough to encompass a plurality of halftone dots. Densitometric standards generally recommend a measurement area of at least ten times the halftone spacing. For example, in a typical commercial print work, the halftone dots are 0.19 mm apart, so a sample area of 2 mm by 2 mm is recommended.

Furthermore, to obtain an accurate measurement from the print work, the sample area has to have color consistency. However, there may not be a lot of large areas with consistent color. As a result, small areas with consistent color are practically acceptable. In some cases, patches smaller than 2 mm by 2 mm can be used if measurements of the corresponding areas are averaged over multiple impressions.

Another consideration for providing accurate measurements is that the color of the region immediately surrounding a sample area has to be reasonably close to that of the actual sample area. Specifically, the color of a surrounding image is known to affect the color of an area, particularly when the area is small. More specifically, the reflected light from a particular sample area scatters laterally in all directions to within a specific distance of the sample area, for example, 0.5 mm. As a result, the color of the area within a specific distance of the sample area has to be within a specified tolerance of the color of the sample area.

Once the suitable sample areas have been identified, determination is made as to whether the collection of sample areas is adequate for the creation of a press profile. Since the CMYK space is practically made of a plurality of requisite profile points, the next step is to determine if the requisite profile points can be obtained from the existing sample areas.

In one embodiment, for each of the requisite profile points in the CMYK space, a list of the sample areas is searched for a closest sample area to the requisite profile point. An example of a closeness measurement is the Euclidean distance between the points in CMYK space. As a result, there is a computed distance for each of the sample areas to a closest requisite profile point.

Once all the distances have been determined, the maximum of these computed distances will be compared against a predetermined limiting distance. If the maximum computed distance is greater than the predetermined limiting distance, the collection of sample areas will be considered inadequate for generating a press profile. In this case, no profile will be generated from the print work. Otherwise, if the maximum computed distance is less than or equal to the predetermined limiting distance, the collection of sample areas will be considered adequate for generating a press profile.

In another embodiment, an existing press profile can be used to estimate partial derivatives of the relationship between the C, M, Y and K tone values and the corresponding L*, a* and b* values. The appropriate derivatives can be used to determine the interpolation error for any interpolation scheme. For example, the error in linear interpolation is largely proportional to the second derivative, and can be obtained with a Taylor's series. More specifically, given a plurality of sample areas, and a particular interpolation scheme, an interpolation error can be estimated for every requisite point in the CMYK space. The error estimate can thereafter be compared with a maximum colorimetric error to determine whether the set of sample areas is accurate.

Furthermore, the prepress process also estimates L*a*b* values from the CMYK values for all pixels at a resolution comparable to the online image. The L*a*b* estimates are then used to generate a template image. During the press process, the template image is used to locate the sample areas in the image acquired online.

Besides the prepress process, the collection of the profile from the print work also requires a press process. In the press process, a color measurement device is used to measure color on the web 104. Specifically, the color measurement device measures the color from a print work. Examples of a measurement device include spectrophotometer and video camera that is specifically configured so as to measure color.

In one embodiment, the video camera takes pictures of the moving web 104 to acquire images of all the sample areas. Subsequently, color processes that provide colorimetrically accurate measurements are performed on the acquired images. Examples of color processes include scattered light correction and nonlinearity correction. The processed images are aligned against the template images. From the alignment information, the position of each of the sample areas in the acquired image can be determined. For each of the sample area positions, a corresponding L*a*b* value is determined. An estimate of the L*a*b* value at each of the requisite CMYK profile points is thereafter determined using interpolation to generate the profile. For example, a tetrahedral interpolation can be used to determine the L*a*b* estimates.

Figure 5:
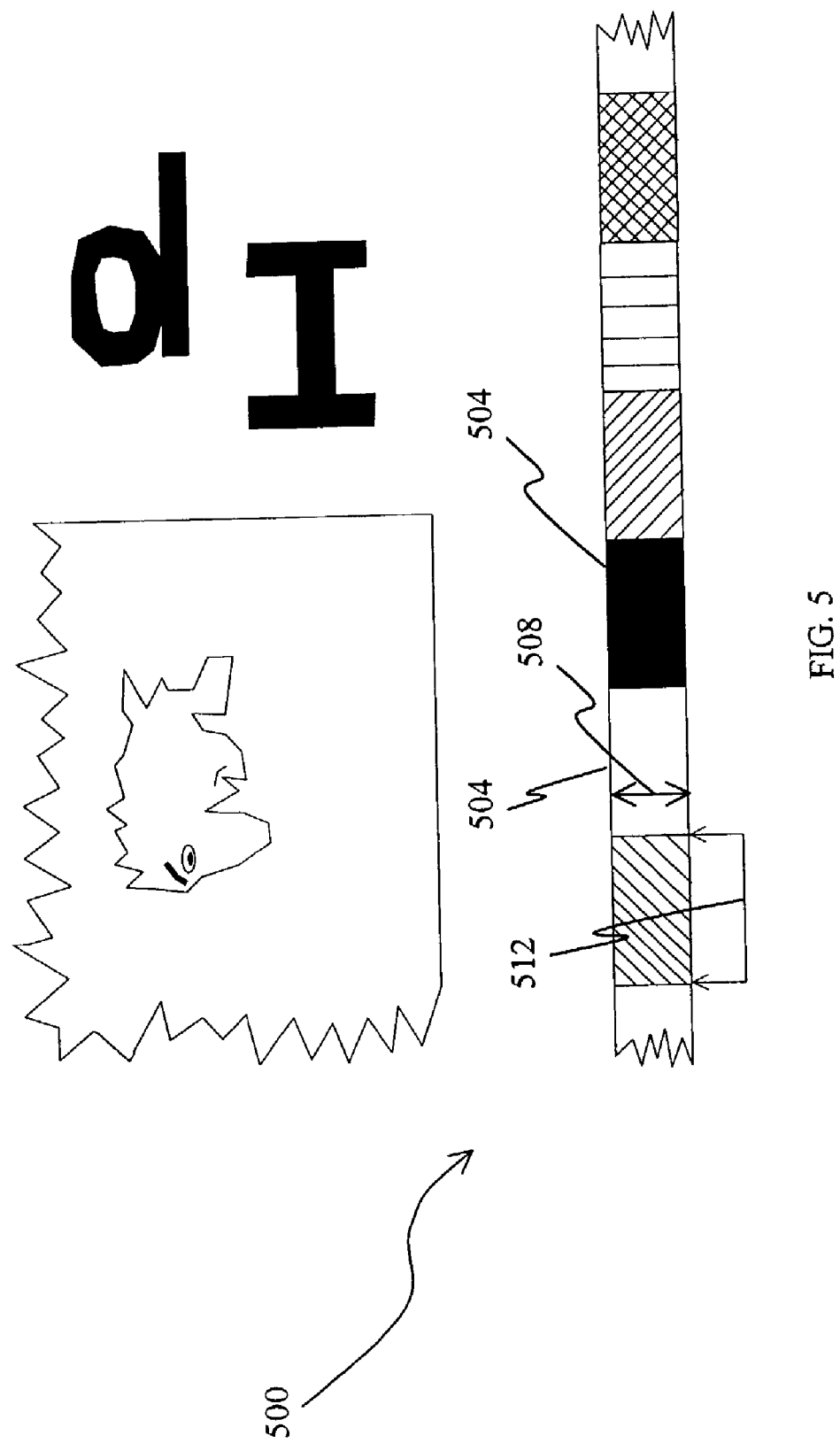
FIG. 5 is an exemplary layout of a portion of a full gamut colorbar.

FIG. 5 is an exemplary layout of a portion of a colorbar 500 according to the present invention. In this example, each patch 504 has a width 508 of 0.06", and a length 512 of 0.1".

The colorbar monitoring system 400 has a plurality of three programmed modes of operations including a makeready mode, a run mode and a profile storage mode. In each of the three operating modes, diagnostic information of the printing process is provided.

The makeready mode is primarily used as an aid during the makeready process. In the makeready mode, the monitoring system 400 scans only the landmark patches. The monitoring system 400 reports or displays three indicators graphically for each of the inks on the user-interface 416, a monitor or other display devices.

Figure 6A:
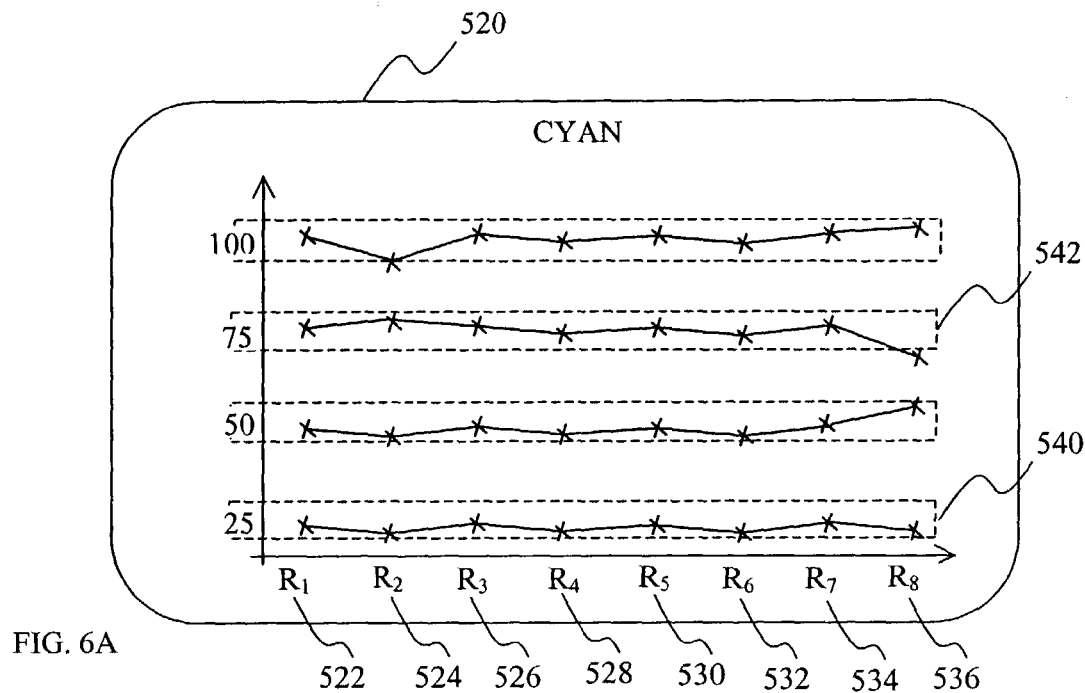
FIG. 6A is an exemplary screen showing a plurality of tone values of a specific ink across eight ribbons.

The first indicator relates to the presence of an anomalous ribbon that may indicate an engraving head calibration problem. In general, a single landmark patch being outside of a certain predetermined tolerance window is an indication of an anomalous ribbon. An exemplary screen 520 is shown in FIG. 6A. The screen 520 shows a plurality of cyan pigment values across eight ribbons $R_1$–$R_8$, (522–536). For each set of cyan values, a tolerance window is shown. For example, a cyan tolerance window 540 shows the patches that are to reflect a cyan value of 25% is within a predetermined tolerance for all ribbons. However, window 542 shows the 8th ribbon, 536. $R_8$ 536 has a cyan value that is outside of the predetermined tolerance for 75% tone value. This often indicates a miscalibration of the engraving head used to engrave the 8th ribbon, $R_8$ 536. Although the cyan values are shown with uniform increments, one of ordinary skill in the art would appreciate that the increments can also be non-uniform as well.

To determine the tolerance window 540, 542, a mean or an average of all the landmark patches of the same type is determined. The tolerance window is then set based on the average and a preset tolerance. An alternative is to set the tolerance window based on a distance between the mean and a standard deviation. For example, if the pixel value is within two standard deviations of the mean, the pixel value is considered acceptable. When an anomalous ribbon is indicated, a press operator will determine if the print cylinder or the blade is to be changed or replaced. In yet another embodiment, the anomalous ribbon indicator is computed from the density measurements of the landmark patches. Furthermore, colorimetric measurements may also be used. In the case of a web offset printing press, there is a plurality of indicators representing a same number of ink key zones across the web. Each indicator then displays either graphically or numerically whether an ink key is properly controlled.

Moreover, a plurality of engraving heads uses diamond styli to carve the cylinder 112. The engraving process is both time-consuming and costly. In particular, the edges of the diamond stylus wear or chip over time. When the diamond stylus has worn or chipped edges, the engraving accuracy will be degraded. For example, the engraving head will not reach its desired cell depth. A shallow cell will affect intake ink volume thereby affecting the eventual print color. A change of color in a particular ribbon may therefore indicate a miscalibrated or a problematic engraving head. Although the change of color may be subtle, a profile that keeps track of the color change over time may provide an adequate indication on the wear of the engraving heads.

Figure 6B:
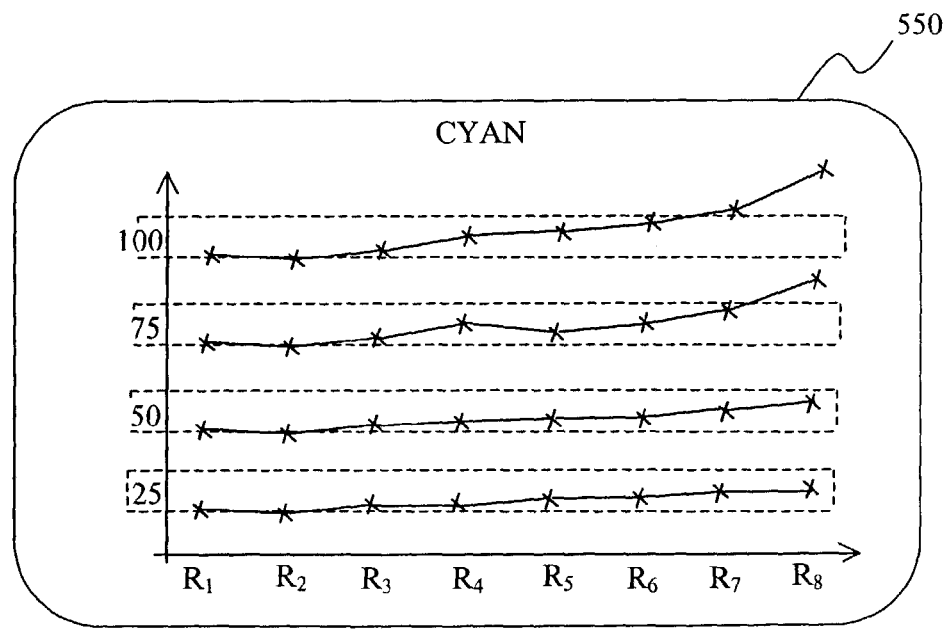
FIG. 6B is an exemplary screen showing a parabolic trend of tone values across eight ribbons.

The second indicator relates to the presence of a linear or parabolic trend in the color across the cylinder, which indicates a potential doctor blade problem. An exemplary screen 550 of the trend is shown in FIG. 6B. Screen 550 shows that high numbered ribbons developed a parabolic trend for all tone values. The trend is usually indicative of a blade problem. Generally, a linear or parabolic curve fit is performed on each predetermined tone value of corresponding landmark patches. A trend may be detected when the fit is outside a predetermined threshold, or when the fit shows a given probability of having a trend when compared with standard statistics. In one embodiment, the trend indicator is determined from the landmark patch density measurements. However, colorimetric measurements may also be used.

In the case of a web offset printing press, a trend shown in the display normally indicates an adjustment may be necessary either with the dampening system or with the ink keys. When there is a consistent trend for all tone values, the ink key may require adjustment. When a trend is a relative trend, the dampening system may require adjustment. A trend is relative when some of the tone values in a first set are outside a first tolerance window while a second set of tone values is within a second tolerance window. For example, when all the solid tone values are within a solid tolerance window, and some of the halftone values are outside a halftone tolerance window, a relative trend is developed thereby requiring possible adjustment of the dampening system. A relative trend below the tolerance window indicates a need to limit the water supply at the dampening system, specifically at the zones involved. On the other hand, a relative trend above the tolerance window indicates a need to supply more water at the dampening system, specifically at the zones involved. In general, the 50% tone value or halftone window provides an adequate indicator of such trend.

The third indicator shows whether the landmark patches are within a predetermined tolerance window for color. However, the predetermined tolerance window varies from one printing job to another depending on the print conditions and customer preference. In one embodiment, the third indicator uses the same tolerance window that is used by the first indicator, that is, the tolerance window is print color statistically derived. Yet in other embodiments, the tolerance window is print work dependent but color statistically independent. For example, a high quality print work prescribed a tight tolerance window that is independent of the color actually printed.

Turning now to the run mode of the monitoring system 400, this mode serves primarily as a quality assurance aid during the normal run of a print job. In this mode, the monitoring system 400 continuously scans for the entire set of color patches, comparing the ink color measurements of these patches with some standard set of color measurements for each patch. An average difference between an acquired patch color and the target patch color over all the patches is generally reported throughout the run mode as a function of time to determine how well the entire run has held color quality. The difference may also be an accumulated mean over the time of the entire run.

Another useful quality assurance statistic for the press operator is an overall under-saturation or over-saturation condition statistic for each of the inks, which can be is determined as follows.

First, the measured patch color is defined as $\{L_i, a_i, b_i\}$ and the target patch color as $\{\hat{L}_i, \hat{a}_i, \hat{b}_i\}$ for the i-th color patch where $1 \leq i \leq n$. The difference between the target patch color and the measured patch color is therefore a color error vector, $\{\hat{L}_i - L_i, \hat{a}_i - a_i, \hat{b}_i - b_i\}$. The color vector represents changes in both direction and magnitude in the color space that the measured patch color needs to have to match the target patch. Thereafter, an estimate of the amount of change in a particular pigment is determined. The change estimate also determines the change that may occur in a particular patch.

A solid ink vector describes the change in color space from a blank paper to the application of a nominal pigmentation of a solid or full tone patch. For each of the inks used in the printing press, one vector is used to represent one solid color. In a four-ink printing press, the solid ink vectors for cyan, magenta, yellow and black are $\{L_c-L_w, a_c-a_w, b_c-b_w\}$, $\{L_m-L_w, a_m-a_w, b_m-b_w\}$, $\{L_y-L_w, a_y-a_w, b_y-b_w\}$, and $\{L_k-L_w, a_k-a_w, b_k-b_w\}$, respectively, where w, c, m, y, and k denote white, cyan, magenta, yellow, and black, respectively.

Some assumptions are made in evaluating the error vector. For example, it is assumed that the change in pigmentation is in the direction of the solid ink vector and that the magnitude is a proportion of the relative change in pigmentation level. If the pigmentation level at time t is $p_t$, and at time t+1 the level has changed to $p_{t+1}$, the change in color for a solid patch with a single ink can be estimated as follows:

$$\{L_S - L_w, a_S - a_w, b_S - b_w\}_{t+1} = \frac{p_{t+1}}{p_t}\{L_S - L_w, a_S - a_w, b_S - b_w\}_t \quad (E2)$$

where S denotes a solid color. Alternatively, Equation (E2) can also be expressed as follows:

$$\{L_S - L_w, a_S - a_w, b_S - b_w\}_{t+1} - \{L_S - L_w, a_S - a_w, b_S - b_w\}_t = \quad (E3)$$
$$\left(\frac{p_{t+1} - p_t}{p_t}\right)\{L_S - L_w, a_S - a_w, b_S - b_w\}_t$$

The estimation made by Equations (E2) and (E3) are reasonably close to the actual change under normal conditions. However, when the magenta ink is highly pigmented, increasing the pigmentation will not result in an increase in chroma, but rather a shift in hue to red. In the case of a web offset press, the amount of change will be referring to a change of an ink film thickness controlled by the ink keys. Hereinafter, whenever pigmentation level or concentration is used in a gravure press, it will be understood that the parameter can be referred to as ink film thickness in a web offset printing press.

To determine a halftone change, the following prediction formula is used:

$$\{L_H - L_w, a_H - a_w, b_H - b_w\}_{i,t+1} - \{L_H - L_w, a_H - a_w, b_H - b_w\}_{i,t} = \quad (E4)$$
$$\left(\frac{p_{t+1} - p_t}{p_t}\right)\{L_H - L_w, a_H - a_w, b_H - b_w\}_{i,t}$$

where H denotes a halftone color. If it is assumed that a halftone color vector is a scaled version of the corresponding solid vector, with the scaling factor being the tone value of the i-th patch, an estimation of a halftone change is as follows:

$$\{L_H - L_w, a_H - a_w, b_H - b_w\}_{i,t} = f(v_i)\{L_S - L_w, a_S - a_w, b_S - b_w\}_t \quad (E5)$$

where $f(v_i)$ is a tone value function of the patch, and $v_i$ the tone value of the patch. In one embodiment, $f(v_i) = v_i$. In another embodiment, $f(v_i) = \sqrt{v_i}$.

Substituting Equation (E5) into Equation (E3), the color change in a single ink halftone patch, based on the change in pigmentation, the tone value and the color of the solid patch is obtained as follows:

$$\{L_H - L_w, a_H - a_w, b_H - b_w\}_{i,t+1} - \{L_H - L_w, a_H - a_w, b_H - b_w\}_{i,t} = \quad (E6)$$
$$\left(\frac{p_{t+1} - p_t}{p_t}\right)f(v_i)\{L_S - L_w, a_S - a_w, b_S - b_w\}_t$$

Note that Equation (E6), which is an estimate of the change in halftone color, requires only knowledge of the solid colors.

To estimate a color change in a patch with more than one ink, and when the pigmentation of one ink is changed, Equation (E6) can still be assumed to applicable. That is, the presence of additional ink in a patch does not appreciably interfere with the estimation of color change.

$$\{L_G - L_w, a_G - a_w, b_G - b_w\}_{i,t+1} - \{L_G - L_w, a_G - a_w, b_G - b_w\}_{i,t} = \quad (E7)$$
$$\left(\frac{p_{t+1} - p_t}{p_t}\right)f(v_i)\{L_S - L_w, a_S - a_w, b_S - b_w\}_t$$

where G denotes patch with a general mixture of inks.

When the color change occurs in a patch that consists of a plurality of inks, and the pigmentation of all the inks are changed, the estimation can be obtained from adding all the individual changes as follows (assuming that the changes are additive):

$$\{L_G - L_w, a_G - a_w, b_G - b_w\}_{i,t+1} - \{L_G - L_w, a_G - a_w, b_G - b_w\}_{i,t} = \quad (E8)$$
$$\left(\frac{p_{C,t+1} - p_{C,t}}{p_{C,t}}\right)f(v_{i,C})\{L_C - L_w, a_C - a_w, b_C - b_w\}_t +$$
$$\left(\frac{p_{M,t+1} - p_{M,t}}{p_{M,t}}\right)f(v_{i,M})\{L_M - L_w, a_M - a_w, b_M - b_w\}_t +$$
$$\left(\frac{p_{Y,t+1} - p_{Y,t}}{p_{Y,t}}\right)f(v_{i,Y})\{L_Y - L_w, a_Y - a_w, b_Y - b_w\}_t +$$
$$\left(\frac{p_{K,t+1} - p_{K,t}}{p_{K,t}}\right)f(v_{i,K})\{L_K - L_w, a_K - a_w, b_K - b_w\}_t$$

where $f(v_i, x)$ is the i-th tone value function of color x, and where $x \in \{C,Y,M,K\}$. That is, the estimate of color change is a sum of all the individual solid color changes. With the blank paper component $\{L_w, a_w, b_w\}$ cancelled out, and substituting $\hat{p}_C = p_{C,t+1}, \hat{p}_Y = p_{Y,t+1}, \hat{p}_M = p_{M,t+1}$, and $\hat{p}_K = p_{K,t+1}$, the following color change estimation is obtained:

$$\{\hat{L}_i - L_i, \hat{a}_i - a_i, \hat{b}_i - b_i\} = \quad (E9)$$
$$\left(\frac{\hat{p}_C - p_{C,t}}{p_{C,t}}\right)f(v_{i,C})\{L_C - L_w, a_C - a_w, b_C - b_w\}_t +$$
$$\left(\frac{\hat{p}_M - p_{M,t}}{p_{M,t}}\right)f(v_{i,M})\{L_M - L_w, a_M - a_w, b_M - b_w\}_t +$$
$$\left(\frac{\hat{p}_Y - p_{Y,t}}{p_{Y,t}}\right)f(v_{i,Y})\{L_Y - L_w, a_Y - a_w, b_Y - b_w\}_t +$$
$$\left(\frac{\hat{p}_K - p_{K,t}}{p_{K,t}}\right)f(v_{i,K})\{L_K - L_w, a_K - a_w, b_K - b_w\}_t$$

where $1 \leq i \leq n$. Equation (E9) is a set of n equations in four unknowns, which can be solved, for example, by least squares. The solution to Equation (E9) can then be used to decide upon the appropriate new levels. The parameters ($\hat{p}_C$, $\hat{p}_M$, $\hat{p}_Y$, and $\hat{p}_K$) can also serve as indications of the quality of a printing run. In particular, a run chart of these parameters is an indication of the degree that the print job was over inked or under inked. The standard deviation of these parameters can be used as an overall weighting. While the estimation is developed based on the assumptions as mentioned, other color change estimation techniques can also be used. For example, a plurality of successive profiles is generated. Between successive profile generation, a color adjustment is made. Based on the adjustment made and the measurements of color in the successive profiles, a derivative of color change with respect to the pigment concentration for each ink at each profile point can be estimated.

Subsequently, an overall saturation value for all pixels of a particular color is determined as follows. For example, the overall saturation for the cyan ink is $$S_{overall,C} = \left( \frac{\hat{p}_C - p_{C,t}}{p_{C,t}} \right).$$

The overall saturation values for the rest of the colors are similarly determined. A positive value for $S_{overall}$ indicates that the overall color for a particular ink is over-saturated, a negative value indicates that the overall color is under-saturated, and a zero value indicates a properly saturated color. Note also that $S_{overall}$ may be either positive or negative. The target pigment concentration for each of the patches may be predetermined for a particular job, or may be established by measurement of the patches taken at the time of printing.

Furthermore, a median tone value of the prepress image is retrieved. The prepress image median is subsequently set as a tone value threshold. Tone values of the acquired image that are lower than the median are grouped and considered as highlight values. Tone values of the acquired image that are higher than the median are also grouped and considered as shadow values. The saturation of the highlight of a particular color is therefore determined based on the group of below-median valued pixels. For the cyan ink, the highlight saturation is $$S_{highlight,C} = \left( \frac{\hat{p}_C - p_{C,t}}{p_{C,t}} \right).$$

For the yellow ink, the highlight saturation is $$S_{highlight,Y} = \left( \frac{\hat{p}_Y - p_{Y,t}}{p_{Y,t}} \right).$$

For the magenta ink, the highlight saturation is $$S_{highlight,M} = \left( \frac{\hat{p}_M - p_{M,t}}{p_{M,t}} \right).$$

For the black ink, the highlight saturation is $$S_{highlight,K} = \left( \frac{\hat{p}_K - p_{K,t}}{p_{K,t}} \right).$$

Even though the median is used dividing the pixels into two groups, other sorting methods can also be used too. For example, pixels with tone values higher than 60% can be considered as shadows, and pixels with tone values lower than 40% can be considered as highlights.

The saturation of the shadow of a particular color can similarly be determined based on the above-median tone valued pixels. For the cyan ink, the shadow saturation is $$S_{shadow,C} = \left( \frac{\hat{p}_C - p_{C,t}}{p_{C,t}} \right).$$

For the yellow ink, the shadow saturation is $$S_{shadow,Y} = \left( \frac{\hat{p}_Y - p_{Y,t}}{p_{Y,t}} \right).$$

For the magenta ink, the shadow saturation is $$S_{shadow,M} = \left( \frac{\hat{p}_M - p_{M,t}}{p_{M,t}} \right).$$

For the black ink, the shadow saturation is $$S_{shadow,K} = \left( \frac{\hat{p}_K - p_{K,t}}{p_{K,t}} \right).$$

In general, a low $S_{highlight}$ is an indication that either the ink is too viscous, or the electrostatic assist is not ejecting the ink from the cells properly. In such case, the highlights are washed out. A low highlight value can also be indicative of a low pigmentation level. Similarly, a high highlight value may indicate that the viscosity of the mixture is low, or the pigmentation level is too high. On the other hand, the pigmentation level affects the shadow values more than it affects the highlight values. If the pigmentation level or the saturation of the pigment goes up, the shadow value will go up sharply with a small increase in the highlight value. It should be noted the values Of $S_{shadow}$ and $S_{highlight}$ generally represent the richness of a color in a lighter tone, and of a color in a darker tone, respectively. While the values of $S_{shadow}$ and $S_{highlight}$ can be determined with the estimation and assumption described above, it will be understood that other estimation techniques can also be used to derive the tone values. For example, weighted least squares can be used to estimate the values of $S_{shadow}$ and $S_{highlight}$.

The monitoring system 400 may also optimally correlate the time of the addition of fluids to the ink with the time of scans. In particular, it may be desirable to know if the addition of fluids occurs midway during a scan across the web. If this occurs, the entire scan is preferably invalidated, since the initial patches of the scan were printed at the previous fluid concentrations, the latter patches of the scan were printed at the latter concentrations.

Turning now to the profile storage mode of the monitoring system 400, in this mode, measurements are made of all of the patches and the results stored as a profile for the particular press under its conditions. Specifically, at a signal from a press operator, the system 400 monitors all the patches across the web 104 in this mode. The monitoring results and the printing conditions including, for example, time, date, paper type, ink formulation, ink temperatures, ink viscosity, customer, press identifier, and the like are subsequently stored in a database as a profile for the press for later retrieval and use. The collection of profile data preferably starts after the press has reached a "Color OK" stage, when the landmark patch statistics are acceptable, and after fluids have been added to the ink fountain 116 for a predetermined amount of time to mix. In one embodiment, the system 400 will advise the press operator when all of these conditions exist, query the press operator whether to store the profile, and store the profile only if the press operator responds affirmatively.

The system 400 may also average a plurality of profiles for a particular production run to reduce processing noise among other things.

Figure 7:
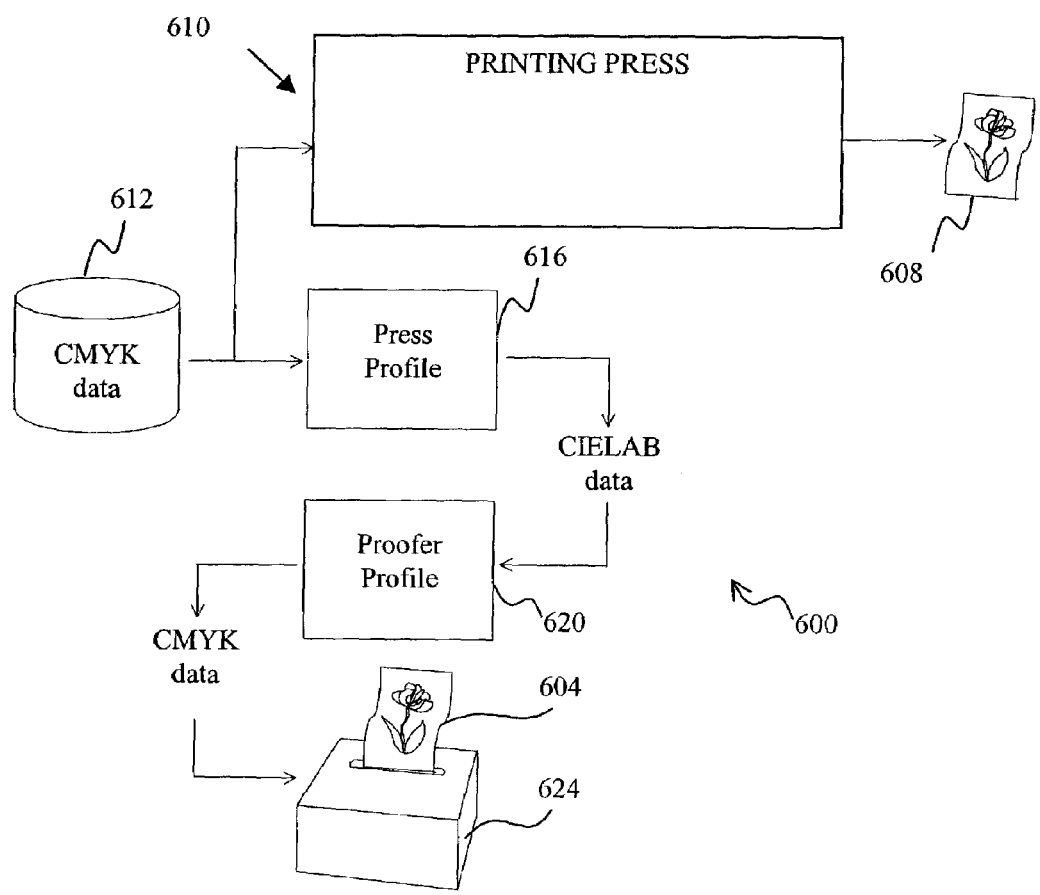
FIG. 7 is a flowchart of a proof generation process.
Figure 7A:
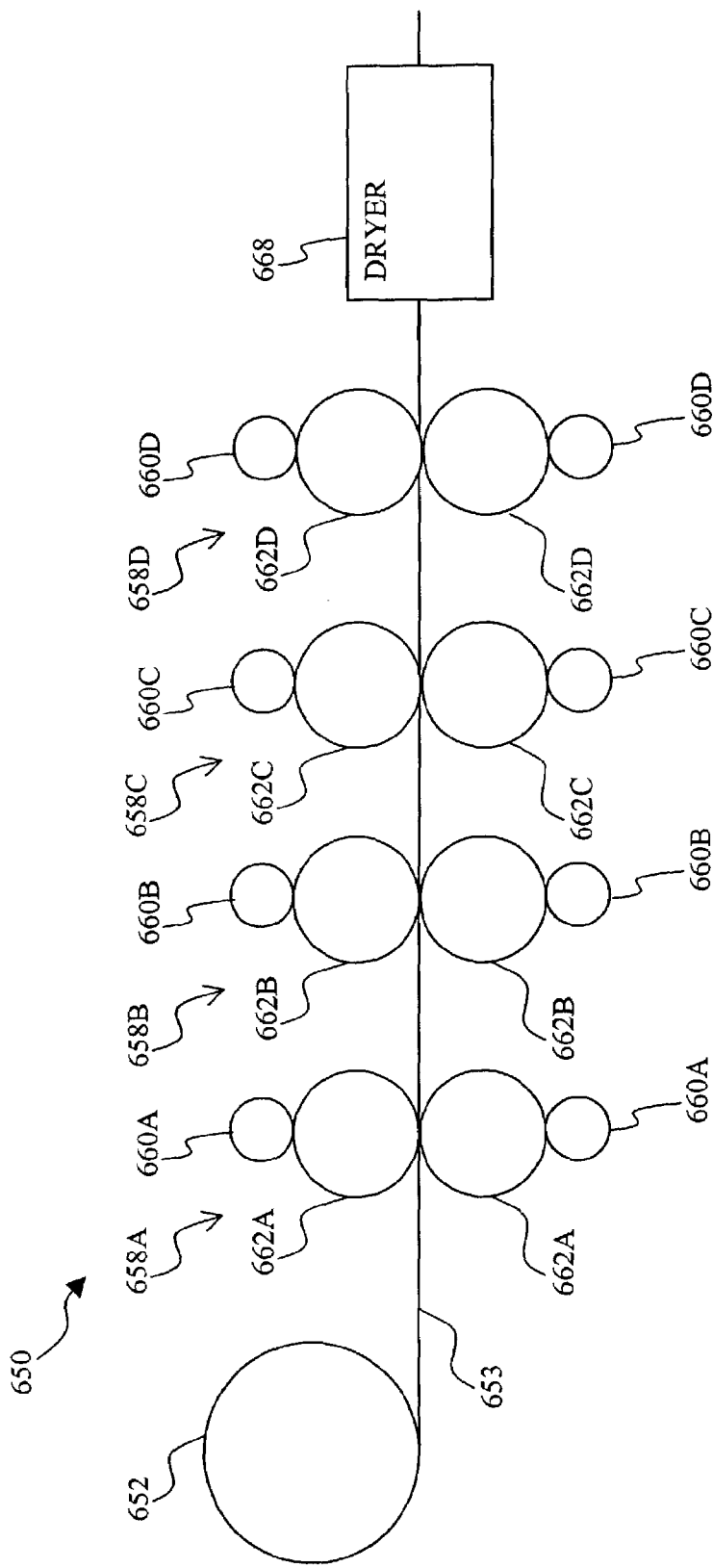
FIG. 7A is a schematic of a web offset printing press.

FIG. 7 illustrates a proof generation process 600 according to the present invention. The process 600 generates a proof 604 that is substantially similar to a print work 608 produced on a printing press 610. Examples of a printing press include the gravure printing press 100 as shown in FIG. 1, and a web offset printing press 650 as shown in FIG. 7A. The web offset printing press 650 includes a paper roll 652 feeding a web 653 into a first print unit 658A. The first printing unit 658A includes a plate 660A and a blanket 662A rotating around on both sides of the web 653. The plate 660A obtains the ink from an ink train. The ink is then transferred to the web 653 via the blanket 662A. The ink transferring process is repeated for each of the three other illustrated print units 658B, 658C and 658D. In a typical web offset printing operation, cyan, magenta, yellow, and black inks are sequentially applied. The web 653 is then dried in a dryer unit 668.

Referring back to FIG. 7, the process 600 starts with a data file 612 that describes the work to be printed. The data file 612 is typically in CMYK format which specifies a plurality of ink tone values at each of the pixels. However, other color formats can also be used. When the proof 604 is requested, the data file 612 is transferred to a press profile lookup table 616 to predict the CIELAB values for each of the pixels in the image. The CMYK value of each pixel is matched with a closest CMYK value from the press profile lookup table 616. The closest CMYK value for each pixel is subsequently transformed into a corresponding CIELAB value.

Next, a transformation from CMYK value to CIELAB value is reversed to obtain a CMYK value of the proof 604. It must be determined which CMYK values on the proofer would produce these color values. To this end, the CIELAB side of the lookup table 600 is searched to find the closest matches and interpolation is again applied to get a corresponding CMYK value for the pixel. The new CMYK values of the pixels are then sent to a proofer 624 to generate the proof 604.

Figure 8:
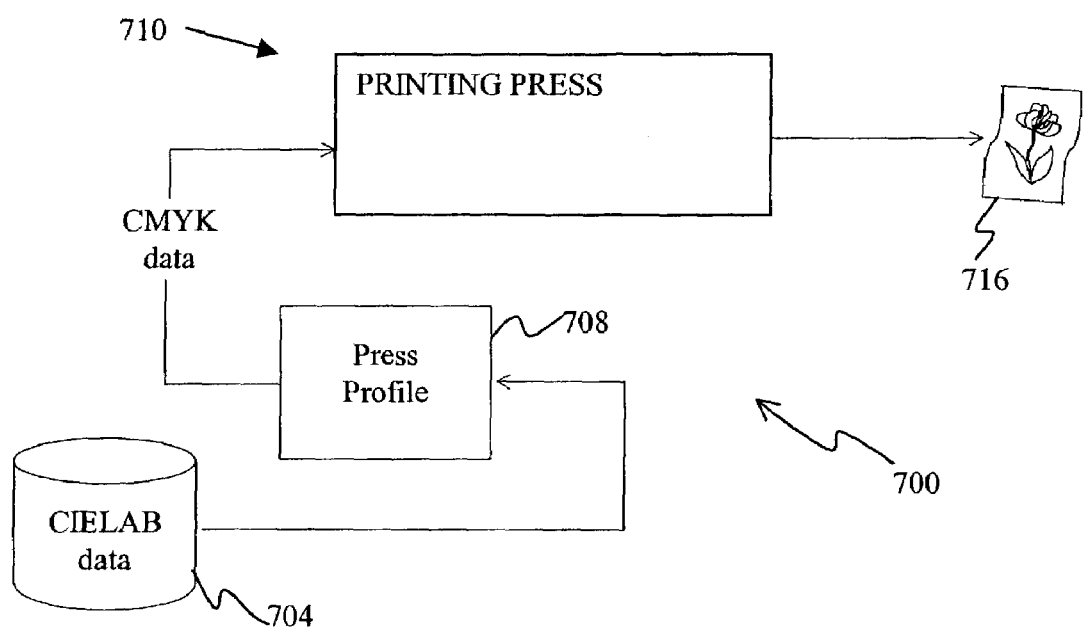
FIG. 8 is a flowchart of a printing process.

Press profiling can also be used to improve colorimetric accuracy of the print work. FIG. 8 illustrates a general printing process 700 according to the present invention. The process starts with a colorimetric description 704 of an image to be printed with a printing press 710. Examples of a printing press 710 include the gravure printing press 100 as shown in FIG. 1, and the web offset printing press 650 as shown in FIG. 7A. The colorimetric description is typically in CIELAB value, however, other formats can also be used. The CIELAB value is fed to a press profile 708, and a corresponding CMYK value is obtained. Specifically, the CIELAB value for each pixel is matched with a closest CIELAB value of the press profile 708. The closest CIELAB value for each pixel is subsequently transformed into a corresponding CMYK value for the pixel. The new CMYK values of the pixels are then used to engrave a plurality of gravure cylinders to produce a printed work 716. In this way, the print work 716 will be substantially similar to the original colorimetric description 704.

In one embodiment, when a profile is to be utilized, the profile will be selected from a plurality of stored profiles for a given gravure press based on the print job information such as paper type, ink formulation, and customer. For example, if it is known that a given paper stock is used for the present press run, the press operator may select the most recent press profile created with that paper stock. Other stored information, such as ink viscosity and temperatures, may be sent to the press operator as preset information.

The detected CMYK or CIELAB values can also be used for print quality assessment. The print quality assessment provides the system 400 with some functions or numbers that indicate a print run quality. The print quality assessment can be stored as part of a profile. Some profiles can also store a plurality of the print quality assessment functions or values over a period of time for many print runs.

To assess a print run quality, the CIELAB measurements from the colorbar are compared with target CIELAB values or average CIELAB values across a run. The comparison yields a color difference that is represented by a $\Delta E$ value. The $\Delta E$ value represents a Euclidean distance between the target and actual colors in CIELAB space. Alternative comparison includes uniform color differencing formula. More specifically, the print run quality is assessed with the measured patches on the colorbar. That is, for every measured patch on the colorbar, a CIELAB difference is determined, thereby resulting in a set of color differences. The number of color differences in a set depends on the number of patches available for a particular web width. The differences can then be accumulated to provide an overall value for each color, or be reported and stored in a profile. When the assessment is performed over time throughout a run, assessment values are repeatedly obtained. The quality assessment values over time generally indicate a colorimetric stability and an accuracy of the run. A variety of methods can be used to store and extract these numbers. For example, averages and standard deviations, and, run charts and histograms can be employed.

Another application of the invention described herein is the automated control of ink color on the gravure press. The statistics (or their equivalents) of $S_{shadow}$ and $S_{highlight}$ provide enough information to attain color quality at the start of the print run and to maintain color quality throughout the run. Thus, it is possible to use the colorbar and the measurement system 400 programmed to generate these two statistics as part of a feedback control system to automatically control color quality on the gravure press.

Figure 9:
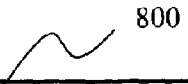
FIG. 9 is a table of color control responses.

Furthermore, the gravure press 100 also utilizes a three fluid system as described earlier. Ink control is effected by adjusting the setpoint for the viscosity, or by adjusting the percentages of concentrated ink and extender. FIG. 9 sets forth a system color control response table 800. The table 800 lists a plurality of actions the system 400 will make based on the values of $S_{shadow}$ and $S_{highlight}$.

In the case of a web offset printing press, the ability of releasing ink from the polymer/aluminum printing plate is based on a dampening process in which water balance, like the viscosity in gravure press, is carefully controlled. Specifically, a wetting agent such as alcohol or the like is added to the mixture to improve the mixture surface tension such that the ink can be released from the plate easily. Hereinafter, it is to be understood that when the viscosity of the mixture is to be adjusted in a gravure press, the water balance is similarly adjusted in a web offset press.

In general, the $S_{highlight}$ statistic primarily reflects the average level of color for midtones and highlights, while the $S_{shadow}$ statistic primarily reflects the average level of color for the shadows. Changing the viscosity set point to a lower viscosity (thinner ink) generally requires the addition of solvent. An addition of solvent not only dilutes the pigment in the ink which decreases both $S_{shadow}$ and $S_{highlight}$ values, it also reduces the ink viscosity thereby allowing tiny cells to release the ink which increases the $S_{highlight}$ value overall. Increasing the percentage of concentrated ink will increase the saturation of all colors which further increases the values of $S_{shadow}$ and $S_{highlight}$. Increasing the percentage of extender will dilute the pigment, which further decreases the values of $S_{shadow}$ and $S_{highlight}$.

Referring back to Table 800 of FIG. 9, notations for increasing and decreasing the viscosity refer to changing the viscosity setpoint accordingly. A control system generally monitors the viscosity before and after the addition of ink mixture and determines if the percentage of solvent in the mixture needs to change. The notation for increasing pigment refers to increasing the percentage of concentrated ink and decreasing the percentage of extender. Similarly, the notation for decreasing pigment refers to decreasing the percentage of concentrated ink and increasing the percentage of extender. The changes and adjustments are preferably performed by the control system 400. However, a press operator can also perform these functions.

Under normal operation, when a sump sensor senses that additional ink or a change in viscosity is needed, the press 100 will actuate an addition of ink and extender. The amount of addition of ink, extender, or solvent and the balance between ink and extender are usually pre-determined. When the system 400 determines that an immediate addition of ink or extender can correct an error or change the viscosity, a preemptive ink dump process is carried out as follows. When the system 400 detects a substantial error or a viscosity adjustment signal, indicated by the statistics of $S_{shadow}$ and $S_{highlight}$, for example, small increments of ink, extender, or solvent will be added to the sump such that the addition does not exceed the sump capacity. Therefore, the amount of ink, extender or solvent added to the sump is generally smaller than a regular ink dump. The preemptive dump therefore quickly alters the statistics Of $S_{shadow}$ and $S_{highlight}$, such that they will be within acceptable tolerance relatively quickly.

Depending on applications, reducing the number of patches scanned can improve the response time of the system 400. Specifically, once the scan time is reduced, the ink changes can be made more responsively. The $S_{shadow}$ and $S_{highlight}$ statistics are then calculated to reflect only the patches actually sampled. Alternatively, if the landmark patches of one representative ribbon 250 are sampled, the system response time can be improved.

Figure 10:
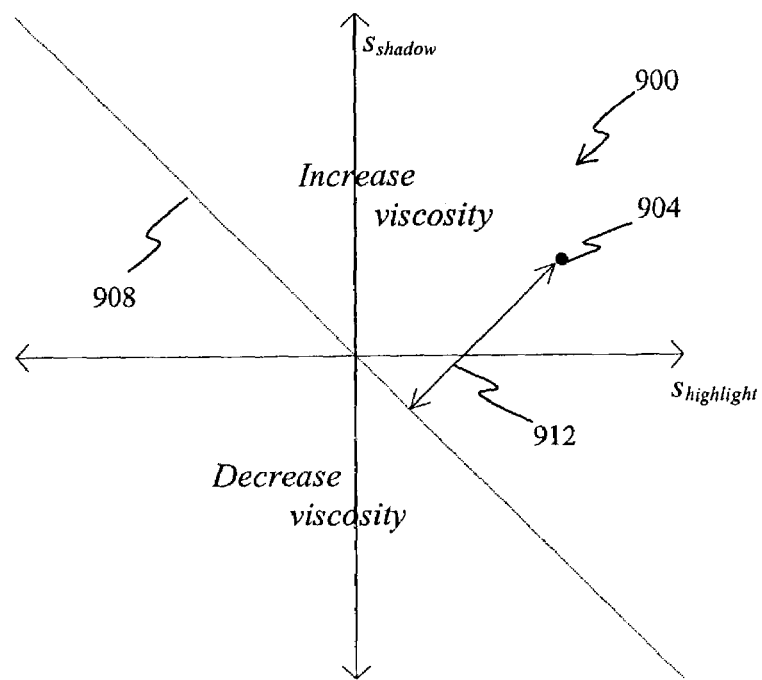
FIG. 10 is a graph illustrating a relationship between viscosity, and highlight and shadow.
Figure 11:
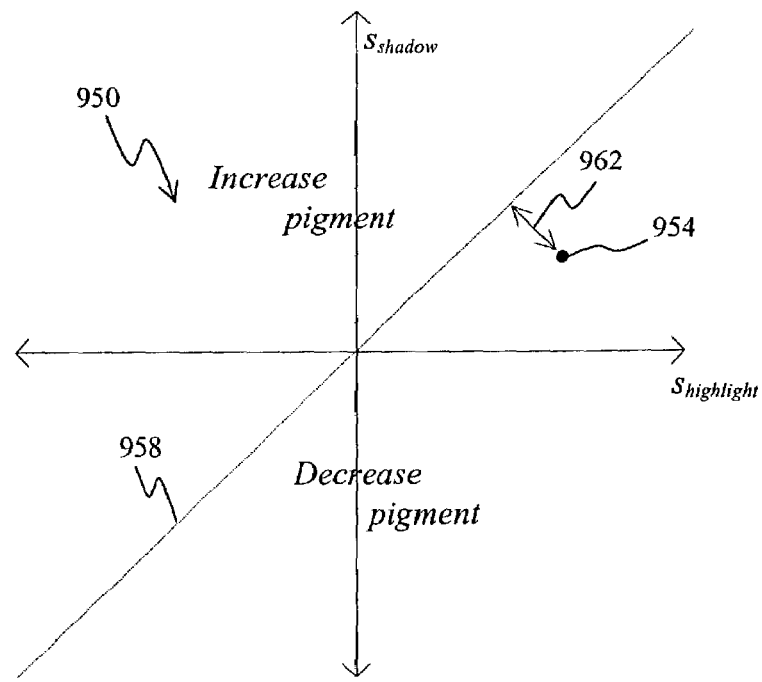
FIG. 11 is a graph illustrating a relationship between pigment concentration and highlight and shadow.

Another approach to improve the system response time is to proportionate an amount of fluid addition according to the size of an error. FIG. 10 illustrates a graph showing first plane 900 relating viscosity to $S_{shadow}$ and $S_{highlight}$. FIG. 11 illustrates a graph showing a second plane 950 relating pigment concentration $S_{shadow}$ and $S_{highlight}$.

The first plane 900 includes $S_{shadow}$ and $S_{highlight}$ statistics as the vertical and horizontal axes, respectively. FIG. 10 also shows an arbitrary point 904. The plane 900 is bisected through the origin with a line 908. The line 908 is at 135° to the $S_{highlight}$ axis. If the arbitrary point 904 falls above and to the right of the line 908, the viscosity is preferably increased. The amount of increase is proportional to the normal distance 912 from the line 908 to the point 904. Also, if the arbitrary point 904 is below and to the left of the line 908, a decrease in viscosity is needed.

The second plane 950 uses $S_{shadow}$ and $S_{highlight}$ statistics as the vertical and horizontal axes, respectively. FIG. 11 also includes an arbitrary point 954. The plane 950 is bisected through the origin by a line 958. The line 958 is at 45° to the $S_{highlight}$ axis. If the arbitrary point 954 is above and to the left of the line 958, then the percentage of concentrated ink is preferably increased. The amount of increase is proportional to a normal distance 962 from the line 804 to the point 954. If the arbitrary point 954 is below and to the right of the line 958, an increase in the percentage of extender is generally needed.

Various features and advantages of the invention are set forth in the following claims.

What is claimed is:

1. A method for the collection of a profile of a printing press, said method comprising:
   printing a colorbar onto a web with the printing press during a production press run, the colorbar including a plurality of individual color patches;
   measuring the color of each of the color patches after acceptable color is achieved and processing the color measurements to generate a profile of the printing press; and
   wherein the profile comprises an average of a plurality of profiles each generated from a separate production press run.

2. The method of claim 1, wherein the printing press comprises a web offset printing press.

3. The method of claim 2, further comprising adjusting an ink and water balance in the press.

4. A method for the collection of a profile of a printing press, said method comprising:
   printing a colorbar onto a web with the printing press during a production press run, the colorbar including a plurality of individual color patches; and
   measuring the color of each of the color patches after acceptable color is achieved and processing the color measurements to generate a profile of the printing press, wherein the printing press is a gravure press with a gravure cylinder and a plurality of engraving heads have each separately engraved a different portion of the gravure cylinder corresponding to a width portion of the web, the method further comprising tracking an engraving head accuracy using color measurements from each of a plurality of identical sets of landmark color patches each printed in a different width portion on the web.

5. A method for profiling a printing press comprising:
   printing a print work on a web with the printing press using a plurality of inks during a production press run;
   adjusting ink color on the printing press until acceptable color of the print work is achieved;

subsequently obtaining a color value measurement at each of a plurality of pre-determined locations on the web during the production press run, and relating the measured color values to a color space defined by the press ink colors and to a device-independent color space to generate a profile, wherein the profile relates color values in a color space defined by the press ink colors to color values in the device-independent color space; and storing the profile; further comprising:

printing a subsequent print work on a web with the printing press using the plurality of inks during a selective subsequent press run;

adjusting the ink color on the printing press until acceptable color of the subsequent print work is achieved;

subsequently obtaining a measured color value at a plurality of pre-determined locations on the web during the selective subsequent production press run, and relating the measured color values to a color space defined by the press ink colors and to a device-independent color space to generate a subsequent profile, wherein the profile relates color values in a color space defined by the press ink colors to color values in the device-independent color space; and storing the subsequent profile.

6. The method of claim 5, wherein the selective subsequent production press run comprises all subsequent production press runs.

7. The method of claim 6, wherein each profile is associated with information regarding printing conditions during each respective production press run.

8. The method of claim 7, wherein the information regarding printing conditions comprises at least one of time, date, paper type, ink formulation, ink temperatures, ink viscosity, customer, and press identifier.

9. A method for profiling a printing press comprising:

printing a print work on a web with the printing press using a plurality of inks during a production press run;

adjusting ink color on the printing press until acceptable color of the print work is achieved;

subsequently obtaining a color value measurement at each of a plurality of pre-determined locations on the web during the production press run, and relating the measured color values to a color space defined by the press ink colors and to a device-independent color space to generate a profile, wherein the profile relates color values in a color space defined by the press ink colors to color values in the device-independent color space;

storing the profile;

using the data in the stored profiles to diagnose printing problems on the printing press; and wherein the printing problems include a malfunctioning of a doctor blade that extends across a gravure cylinder.

10. A method for the collection of a profile of a printing press, said method comprising:

printing a colorbar onto a web with a printing press during a production press run, the colorbar including a plurality of individual color patches;

measuring the color of each of the color patches directly on press in a measured color space, and relating the color measurements to a device independent color space for each patch, to generate a first profile of the printing press which relates color values in the color space of the printing press to a device-independent color space;

repeating the printing and measuring steps during a second production press run to generate a second profile of the printing press;

storing each profile in conjunction with data pertaining to one or more printing conditions during the respective production press run, wherein the data pertaining to the printing conditions comprises at least one of paper type, ink formulation, ink temperature, and ink viscosity; and subsequently selecting the first or second profile according to an anticipated printing condition in order to replicate desired colors in a subsequently printed work.

11. The method of claim 10, wherein the printing press comprises a gravure printing press.

12. The method of claim 10, wherein the printing press comprises a web offset printing press.

13. A press printing method comprising:

generating a plurality of profiles of a single printing press under varying printing conditions during production press runs, wherein the profiles relate color values in a color space defined by the press ink colors to color values in a device-independent color space;

storing the profiles for subsequent retrieval along with the varying printing conditions;

selecting one of the stored profiles according to an anticipated printing condition;

using the information in the selected stored profile to produce a proof of a printed product on a proofer which more closely resembles the printed product had it been produced on the press in a subsequent production press run, wherein the varying printing conditions include at least one of time, date, paper type, ink formulation, ink temperatures, ink viscosity, customer, and press identifier; and further comprising selecting a stored profile that most closely matches the anticipated printing conditions of the subsequent production press run.

14. The method of claim 13, wherein the selected profile comprises an average of at least two stored profiles.

15. A press printing method comprising:

generating a plurality of profiles of a single printing press under varying printing conditions during production press runs, wherein the profiles relate color values in a color space defined by the press ink colors to color values in a device-independent color space;

storing the profiles for subsequent retrieval along with the varying printing conditions;

selecting one of the stored profiles according to an anticipated printing condition;

using the information in the selected stored profile to produce a proof of a printed product on a proofer which more closely resembles the printed product had it been produced on the press in a subsequent production press run, wherein the varying printing conditions include at least one of time, date, paper type, ink formulation, ink temperatures, ink viscosity, customer, and press identifier; and further comprising selecting a stored profile that has printing conditions similar to the anticipated printing conditions of the subsequent production press run.

16. A press printing method comprising:

generating a plurality of profiles of a single press under varying printing conditions during production press runs, wherein the profiles relate color values in a color space defined by the press ink colors to color values in a device-independent color space;

storing the profiles for subsequent retrieval along with the varying printing conditions;

selecting one of the stored profiles according to printing conditions in a subsequent production press run;

using the information in the selected stored profile in the subsequent production press run to produce a printed product having an actual ink color that more closely matches a desired ink color; and further comprising selecting a stored profile that most closely matches the printing conditions of the subsequent production press run.

17. A method of printing comprising:

printing a colorbar onto a web with a gravure printing press during a production press run, the colorbar including individual color patches in sets of landmark color patches, wherein the gravure printing press further comprises a gravure cylinder, wherein engraving heads each engrave a specific portion of the gravure cylinder, with each specific portion of the cylinder corresponding to a specific width section of the web, and wherein a set of landmark color patches is printed in each width section of the web such that each set corresponds to a separate engraving head;

measuring the color of the landmark color patches;

using the color measurements for diagnostic purposes in the gravure printing press; and further comprising evaluating a doctor blade functionality with the color measurements of the landmark color patches.

18. A method of printing comprising:

printing a colorbar onto a web with a gravure printing press during a production press run, the colorbar including individual color patches in sets of landmark color patches, wherein the gravure printing press further comprises a gravure cylinder, wherein engraving heads each engrave a specific portion of the gravure cylinder, with each specific portion of the cylinder corresponding to a specific width section of the web, and wherein a set of landmark color patches is printed in each width section of the web such that each set corresponds to a separate engraving head;

measuring the color of the landmark color patches;

using the color measurements for diagnostic purposes in the gravure printing press; and further comprising adjusting the proportion of concentrated ink used in the ink fountain of the press based upon the color measurements of the landmark color patches.

19. The method of claim 18, wherein the proportion of an extender is also adjusted.

20. The method of claim 18, wherein the adjustments are performed without operator intervention.

21. A method of generating a profile of a printing press, said method comprising:

producing a print work in a printing press during a production run, the print work including a plurality of pre-determined locations having various combinations of ink;

adjusting ink color on the printing press until acceptable color of the print work is achieved;

subsequently measuring a color value at each of the plurality of pre-determined locations in the print work;

generating a profile based the measured color values, wherein the profile relates color values in a color space defined by the press ink colors to color values in a device-independent color space; and further comprising:

developing the predetermined locations from prepress data; and identifying predetermined locations from the print work.

22. A method of generating a profile of a printing press, said method comprising:

producing a print work in a printing press during a production run, the print work including a plurality of pre-determined locations having various combinations of ink;

adjusting ink color on the printing press until acceptable color of the print work is achieved;

subsequently measuring a color value at each of the plurality of pre-determined locations in the print work;

generating a profile based the measured color values, wherein the profile relates color values in a color space defined by the press ink colors to color values in a device-independent color space; and further comprising:

determining a number of ink combinations of the predetermined locations printed on the print work;

terminating the generation of a profile when the number of ink combinations is insufficient.

23. A gravure printing method for controlling the viscosity and pigment of each of a plurality of ink colors, the method comprising:

printing a colorbar onto a web with a gravure printing press using a plurality of ink colors, the colorbar including a plurality of patches having different tone values for each ink color;

determining a median tone value of the patches for each ink color using one of a pre-press image and a color OK sheet, measuring the ink color of each of the patches during a production press run;

for each ink color, categorizing the patches as a highlight patch or a shadow patch based upon a comparison to the median tone value;

for each ink color, generating an estimated pigment value;

for each ink color, determining a highlight saturation statistic, $S_{highlight}$, of the highlight patches based on the estimated pigment value, and determining a shadow saturation statistic, $S_{shadow}$, of the shadow patches based on the estimated pigment value; and for each ink color, controlling the viscosity and pigment of that ink based on the corresponding highlight and shadow saturation statistics.

24. The gravure printing method of claim 23, wherein the viscosity is decreased by the addition of solvent to the ink.

25. The gravure printing method of claim 24, wherein the pigment is decreased by increasing an amount of extender in the ink.

26. The gravure printing method of claim 25, wherein an addition of extender for each ink color is also controlled based on the corresponding highlight and shadow saturation statistics.

27. The gravure printing method of claim 26, wherein increments of ink, extender, or solvent are only added to the sump if the sump has capacity for the addition.

28. The gravure printing method of claim 23, wherein $S_{shadow}$ and $S_{highlight}$ are each classified as being low, high, or in tolerance, and wherein if $S_{shadow}$ is low and $S_{highlight}$ is low, then the pigment is increased, and the viscosity is unchanged.

29. The gravure printing method of claim 23, wherein $S_{shadow}$ and $S_{highlight}$ are each classified as being low, high, or in tolerance, and wherein if $S_{shadow}$ is low and $S_{highlight}$ is in tolerance, then the pigment is increased, and the viscosity is increased.

30. The gravure printing method of claim 23, wherein $S_{shadow}$ and $S_{highlight}$ are each classified as being low, high, or in tolerance, and wherein if $S_{shadow}$ is low and $S_{highlight}$ is high, then the pigment is unchanged, the viscosity is increased.

31. The gravure printing method of claim 23, wherein $S_{shadow}$ and $S_{highlight}$ are each classified as being low, high, or in tolerance, and wherein if $S_{shadow}$ is in tolerance and $S_{highlight}$ is low, then the pigment is increased, and the viscosity is decreased.

32. The gravure printing method of claim 23, wherein $S_{shadow}$ and $S_{highlight}$ are each classified as being low, high, or in tolerance, and wherein if $S_{shadow}$ is in tolerance and $S_{highlight}$ is in tolerance, then the pigment is unchanged, and the viscosity is unchanged.

33. The gravure printing method of claim 23, wherein $S_{shadow}$ and $S_{highlight}$ are each classified as being low, high, or in tolerance, and wherein if $S_{shadow}$ is in tolerance and $S_{highlight}$ is high, then the pigment is decreased, and the viscosity is increased.

34. The gravure printing method of claim 23, wherein $S_{shadow}$ and $S_{highlight}$ are each classified as being low, high, or in tolerance, and wherein if $S_{shadow}$ is high and $S_{highlight}$ is low, then the pigment is unchanged, and the viscosity is decreased.

35. The gravure printing method of claim 23, wherein $S_{shadow}$ and $S_{highlight}$ are each classified as being low, high, or in tolerance, and wherein if $S_{shadow}$ is high and $S_{highlight}$ is in tolerance, then the pigment is decreased, and the viscosity is decreased.

36. The gravure printing method of claim 23, wherein $S_{shadow}$ and $S_{highlight}$ are each classified as being low, high, or in tolerance, and wherein if $S_{shadow}$ is high and $S_{highlight}$ is high, then the pigment is decreased, and the viscosity is unchanged.

* * * * *

UNITED STATES PATENT AND TRADEMARK OFFICE
CERTIFICATE OF CORRECTION

PATENT NO. : 7,032,508 B2  Page 1 of 1
APPLICATION NO. : 10/394903
DATED : April 25, 2006
INVENTOR(S) : John C. Seymour It is certified that error appears in the above-identified patent and that said Letters Patent is hereby corrected as shown below:

Column 21:
line 63, replace "device independent" with --device-independent--.

Column 23:
line 61, insert --on-- after the word "based".

Column 24:
line 12, insert --on-- after the word "based".

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,032,508 C1 | Page 1 of 1 |
| APPLICATION NO. | : 95/001600 | |
| DATED | : January 2, 2014 | |
| INVENTOR(S) | : Seymour | |

It is certified that error appears in the above-identified patent and that said Letters Patent is hereby corrected as shown below:

In the Claims

In Column 1, Line 59:
   Please delete the number "44" and insert the number --49--

In Column 1, Line 61:
   Please delete the number "44" and insert the number --49--

In Column 2, Line 60:
   Please delete the word "a" and insert the word --the--

In Column 2, Line 62:
   Please delete the word "a" and insert the word --the--

In Column 3, Line 8:
   Please delete the word "a" and insert the word --the--

Signed and Sealed this
Twenty-second Day of April, 2014

Michelle K. Lee
*Deputy Director of the United States Patent and Trademark Office*

(12) INTER PARTES REEXAMINATION CERTIFICATE (782nd)
United States Patent
Seymour

(10) Number: US 7,032,508 C1
(45) Certificate Issued: Jan. 2, 2014

(54) PRINTING PRESS

(75) Inventor: John C. Seymour, Jefferson, WI (US)

(73) Assignee: JPMorgan Chase Bank, N.A., Chicago, IL (US)

Reexamination Request:
No. 95/001,600, Apr. 14, 2011

Reexamination Certificate for:
Patent No.: 7,032,508
Issued: Apr. 25, 2006
Appl. No.: 10/394,903
Filed: Mar. 21, 2003

Certificate of Correction issued Sep. 7, 2010

(51) Int. Cl.
*B41F 5/00* (2006.01)

(52) U.S. Cl.
USPC ............ 101/211; 101/483; 101/484; 358/1.9

(58) Field of Classification Search
USPC ........................................ 101/211
See application file for complete search history.

(56) References Cited

To view the complete listing of prior art documents cited during the proceeding for Reexamination Control Number 95/001,600, please refer to the USPTO's public Patent Application Information Retrieval (PAIR) system under the Display References tab.

*Primary Examiner* — Pia Tibbits

(57) ABSTRACT

An apparatus and method is described wherein a printing press is profiled during production press runs and wherein ink color is controlled.

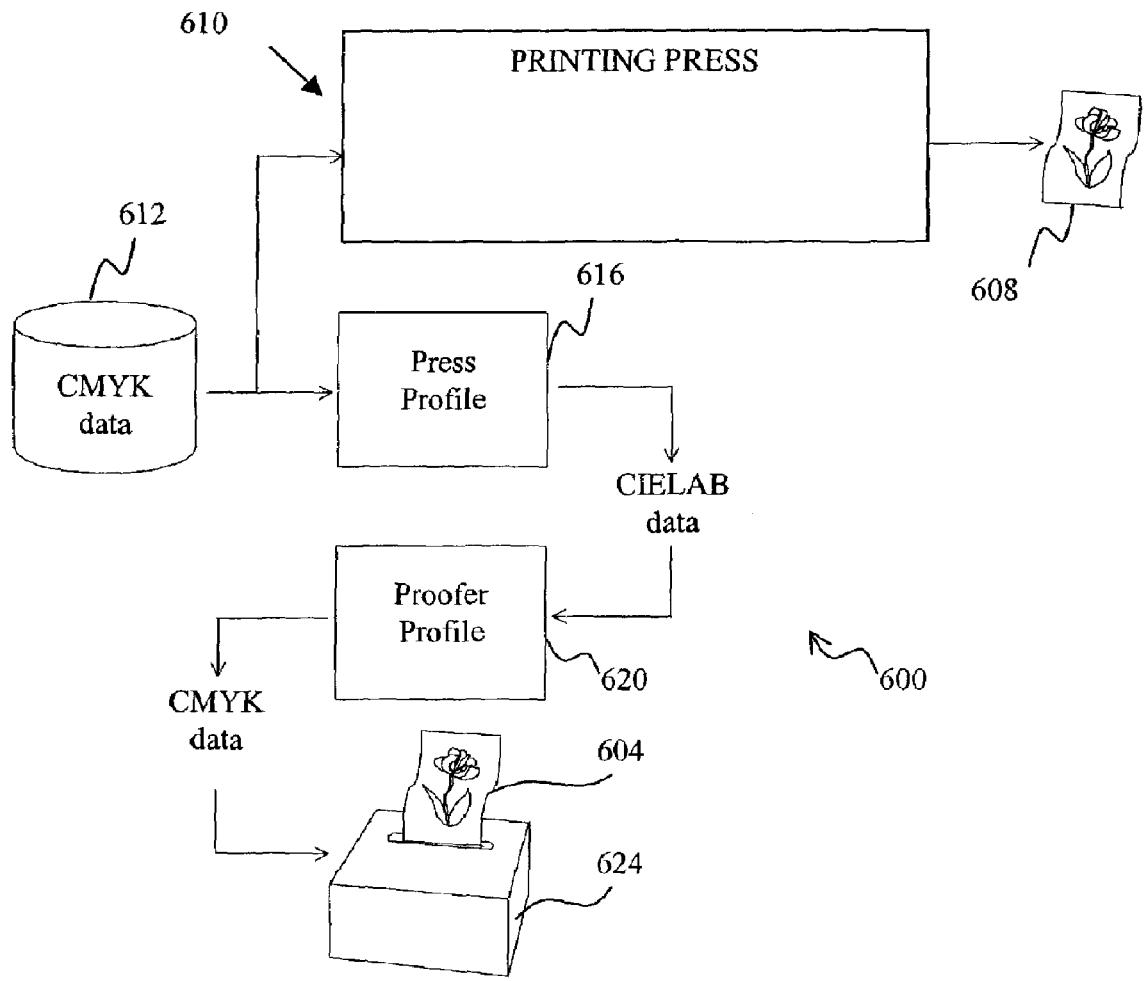

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-36 is confirmed.

New claims 37-76 are added and determined to be patentable.

37. *The method of claim 1 wherein the measuring step occurs on the press and during the production press run which is the production press run during which the printing step occurs.*

38. *The method of claim 1 further comprising, after the printing step and before the measuring step, adjusting the color of the color patches until acceptable color of the color patches is achieved.*

39. *The method of claim 1, wherein the profile that is generated by measurements during the measuring step further includes press data including data concerning paper type.*

40. *The method of claim 1, wherein the profile that is generated by measurements during the measuring step includes a set of values to which production run data is compared.*

41. *The method of claim 1, wherein the profile includes the color values measured of each of the plurality of color patches, and wherein the measuring occurs on the press and during the production press run.*

42. *A press printing method as in claim 13 wherein the selected profile comprises an average of a plurality of profiles each generated from a separate production press run.*

43. *The method of claim 21, wherein the profile includes a set of values to which production run data is compared.*

44. *The method of claim 43, wherein the print work is separate from a colorbar.*

45. *The method of claim 43, wherein the printing press is a web offset printing press.*

46. *The method of claim 44, where the production run is a production press run.*

47. *The method of claim 44, wherein the production run comprises a make-ready mode.*

48. *The method of claim 44, wherein subsequently measuring a color value at each of the plurality of pre-determined locations in the print work comprises measuring a color value through a measuring system.*

49. *The method of claim 44, wherein the measuring system is a monitoring system.*

50. *The method of claim 44, wherein the monitoring system includes at least a camera.*

51. *The method of claim 44, wherein the monitoring system is a video-based monitoring system.*

52. *The method of claim 44, wherein the step of subsequently measuring a color value at each of the plurality of pre-determined locations in the print work includes measuring the color value at each of the plurality of predetermined locations through a monitoring system.*

53. *The method of claim 44, wherein the profile comprises information useful for quality control.*

54. *The method of claim 44, further comprising using the information of the profile for quality control.*

55. *The method of claim 44, further comprising further adjusting the ink color on the printing press through use of measured color values.*

56. *The method of claim 44, wherein the profile is provided at least in part by the measured values.*

57. *The method of claim 44, wherein the profile further comprises press data.*

58. *The method of claim 57 wherein the press data comprises paper information.*

59. *The method of claim 44, wherein the profile comprises the color values measured at each of the plurality of pre-determined locations, and wherein the measuring occurs during the production run.*

60. *The method of claim 59, wherein the profile is generated during the production press run.*

61. *The method of claim 44, wherein the profile comprises color values useful for modifying one or more of (a) the colors of a proof and (b) the colors produced on press of the production-run-produced print work, such that the proof matches more closely the production-run-produced print work or the production-run-produced print work matches more closely with target colors.*

62. *The method of claim 44, wherein developing the pre-determined locations from prepress data occurs during a prepress process that precedes a press process.*

63. *The method of claim 44, wherein developing the pre-determined locations from prepress data occurs before identifying predetermined locations from the print work.*

64. *The method of claim 63, wherein identifying predetermined locations from the print work occurs during a production press run.*

65. *The method of claim 44, wherein the printing press is a web offset printing press, wherein the production run is a production press run, wherein subsequently measuring a color value at each of the plurality of pre-determined locations in the print work comprises measuring a color value through a measuring system, wherein the profile is provided by the measured values, wherein the print work is separate from a colorbar, wherein developing the predetermined locations from prepress data occurs during a prepress process that precedes the production press run, wherein identifying predetermined locations from the print work occurs during the production press run, and wherein the method further comprises further adjusting the ink color on the printing press through use of measured color values.*

66. *The method of claim 44 wherein generating a profile includes color processes that provide colorimetrically accurate measurements.*

67. *The method of claim 44 wherein generating a profile comprises a color process to convert RBG color space to a device-independent color space.*

68. *The method of claim 67 wherein the device-independent color space is XYZ.*

69. *The method of claim 67 wherein the device-independent color space is L\*a\*b\*.*

70. *The method of claim 44 wherein generating a profile employs CMYK and CEILAB values.*

71. *The method of claim 44 wherein generating a profile comprises determining L\*a\*b\* values.*

72. *The method of claim 71 wherein determining L\*a\*b\* values uses interpolation.*

73. *The method of claim 44 wherein acceptable color is color that falls within predetermined limits.*

74. The method of claim 44 wherein acceptable color is color that is maintained by proper control of an ink key.

75. The method of claim 44, wherein generating the profile based on the measured color values comprises using measured color value in generating the profile.

76. The method of claim 44, wherein generating the profile based on the measured color values comprises determining whether to create a profile from the measured color value.

\* \* \* \* \*